(12) United States Patent
Ono et al.

(10) Patent No.: US 10,590,550 B2
(45) Date of Patent: Mar. 17, 2020

(54) ELECTROCHEMICAL REACTION DEVICE

(71) Applicant: KABUSHIKI KAISHA TOSHIBA, Minato-ku (JP)

(72) Inventors: Akihiko Ono, Kita (JP); Satoshi Mikoshiba, Yamato (JP); Yuki Kudo, Yokohama (JP); Ryota Kitagawa, Setagaya (JP); Jun Tamura, Minato (JP); Yoshitsune Sugano, Kawasaki (JP); Eishi Tsutsumi, Kawasaki (JP); Masakazu Yamagiwa, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 241 days.

(21) Appl. No.: 15/251,825

(22) Filed: Aug. 30, 2016

(65) Prior Publication Data

US 2017/0067171 A1  Mar. 9, 2017

(30) Foreign Application Priority Data

Sep. 4, 2015  (JP) ................................. 2015-174527

(51) Int. Cl.
*C25B 9/20* (2006.01)
*C25B 1/00* (2006.01)
(Continued)

(52) U.S. Cl.
CPC ................ *C25B 9/20* (2013.01); *C25B 1/003* (2013.01); *C25B 1/08* (2013.01); *C25B 1/10* (2013.01);
(Continued)

(58) Field of Classification Search
CPC .. C25B 1/003; C25B 1/08; C25B 1/10; C25B 3/04; C25B 9/10; C25B 9/20; C25B 15/08; Y02P 20/135; Y02E 60/366
See application file for complete search history.

(56) References Cited

U.S. PATENT DOCUMENTS

2010/0133111 A1   6/2010  Nocera et al.
2012/0292199 A1*  11/2012  Deguchi ................... C25B 3/04
                                                              205/440

(Continued)

FOREIGN PATENT DOCUMENTS

JP       2004-197167       7/2004
JP       2012-505310       3/2012
(Continued)

OTHER PUBLICATIONS

Miguel A. Modestino et al. "Robust production of purified H2 in a stable, self-regulating, and continuously operating solar fuel generator", Energy & Environmental Science, vol. 7, 2014, 5 pages.

*Primary Examiner* — Ciel P Thomas
(74) *Attorney, Agent, or Firm* — Oblon, McClelland, Maier & Neustadt, L.L.P.

(57) ABSTRACT

An electrochemical reaction device includes a first unit group having a plurality of first electrochemical reaction units and a second unit group having a plurality of second electrochemical reaction units. Respective electrolytic tanks of the plurality of first electrochemical reaction units are serially connected with each other. Respective electrolytic tanks of the plurality of second electrochemical reaction units are serially connected with each other. The electrolytic tanks of the plurality of second electrochemical reaction units are parallelly connected to the electrolytic tanks of the plurality of first electrochemical reaction units.

4 Claims, 10 Drawing Sheets

(51) Int. Cl.
- *C25B 1/10* (2006.01)
- *C25B 1/08* (2006.01)
- *C25B 3/04* (2006.01)
- *C25B 9/10* (2006.01)
- *C25B 15/08* (2006.01)

(52) U.S. Cl.
CPC ............... *C25B 3/04* (2013.01); *C25B 9/10* (2013.01); *C25B 15/08* (2013.01); *Y02E 60/366* (2013.01); *Y02P 20/135* (2015.11)

(56) References Cited

U.S. PATENT DOCUMENTS

| | | | |
|---|---|---|---|
| 2014/0072891 A1 | 3/2014 | Suzuki et al. | |
| 2015/0072254 A1* | 3/2015 | Suzuki | C25B 1/04 429/422 |
| 2015/0129419 A1* | 5/2015 | Sekiguchi | C02F 1/4672 204/252 |
| 2015/0298998 A1* | 10/2015 | Legzdins | C02F 1/46104 205/748 |
| 2016/0044926 A1* | 2/2016 | Peters | A01N 59/00 205/335 |
| 2016/0281244 A1 | 9/2016 | Sato et al. | |

FOREIGN PATENT DOCUMENTS

| | | |
|---|---|---|
| JP | 2012-177159 | 9/2012 |
| JP | 2013-155101 | 8/2013 |
| JP | 2014-97910 | 5/2014 |
| WO | WO 2013/153779 A1 | 10/2013 |
| WO | WO 2014/128813 A1 | 8/2014 |
| WO | WO 2015/087691 A1 | 6/2015 |

* cited by examiner

ELECTROCHEMICAL REACTION DEVICE

CROSS-REFERENCE TO RELATED APPLICATION

This application is based upon and claims the benefit of priority from Japanese Patent Application No. 2015-174527 filed on Sep. 4, 2015; the entire contents of which are incorporated herein by reference.

FIELD

Embodiments described herein generally relate to an electrochemical reaction device.

BACKGROUND

The development of artificial photosynthesis technology that replicates photosynthesis of plants to electrochemically convert sunlight to a chemical substance has been recently progressing in consideration of an energy problem and an environmental problem. Converting sunlight to a chemical substance to store it in a cylinder or a tank is advantageous in that it costs lower for energy storage and has a less storage loss than converting sunlight to electricity to store it in a battery.

A known electrochemical reaction device that electrochemically converts sunlight to a chemical substance is, for example, a two-electrode device including an electrode having a reduction catalyst for reducing carbon dioxide ($CO_2$) and an electrode having an oxidation catalyst for oxidizing water ($H_2O$), the electrodes being immersed in water containing dissolved carbon dioxide. In this case, these electrodes are electrically connected to each other via an electric wire or the like. The electrode having the oxidation catalyst oxidizes $H_2O$ using light energy to produce oxygen ($\frac{1}{2}O_2$) and obtain a potential. The electrode having the reduction catalyst obtains the potential from the electrode that causes the oxidation reaction, thereby reducing carbon dioxide to produce formic acid (HCOOH) or the like. Such two-stage excitation for obtaining the reduction potential of the carbon dioxide makes the two-electrode device low in conversion efficiency from the sunlight to the chemical energy.

An electrochemical reaction device including a stack (silicon solar cell or the like) of a pair of electrodes and a photoelectric conversion layer sandwiched therebetween is also under investigation. The electrode on a light irradiated side oxidizes water ($2H_2O$) using light energy to produce oxygen ($O_2$) and hydrogen ions ($4H^1$). The electrode on the opposite side uses the hydrogen ions ($4H^+$) produced in the electrode on the light irradiated side and a potential ($e^-$) generated in the photoelectric conversion layer to produce hydrogen ($2H_2$) or the like as a chemical substance. An electrochemical reaction device including a stack of silicon solar cells is also known. The aforesaid electrochemical reaction device preferably has high conversion efficiency.

DETAILED DESCRIPTION

An electrochemical reaction device according to the embodiment includes: a first unit group having a plurality of first electrochemical reaction units; and a second unit group having a plurality of second electrochemical reaction units, wherein each of the first and second electrochemical reaction units has: an electrolytic tank having a first storage part storing a first electrolytic solution containing substances to be reduced and a second storage part storing a second electrolytic solution containing substances to be oxidized; a reduction electrode layer immersed in the first electrolytic solution; an oxidation electrode layer immersed in the second electrolytic solution; and a generator electrically connected to the reduction electrode and the oxidation electrode layer. Electrolytic tanks of the plurality of first electrochemical reaction units are serially connected with each other. Electrolytic tanks of the plurality of second electrochemical reaction units are serially connected with each other. The electrolytic tanks of the plurality of second electrochemical reaction units are parallelly connected to the electrolytic tanks of the plurality of first electrochemical reaction units.

Embodiments will be hereinafter described with reference to the drawings. The drawings are schematic, and for example, the sizes such as the thickness and width of each constituent element may differ from the actual sizes of the constituent element. In the embodiments, substantially the same constituent elements are denoted by the same reference signs and a description thereof will be omitted in some case. In this specification, "to connect" not only means "to directly connect" but also may include the meaning of "to indirectly connect".

Figure 1:
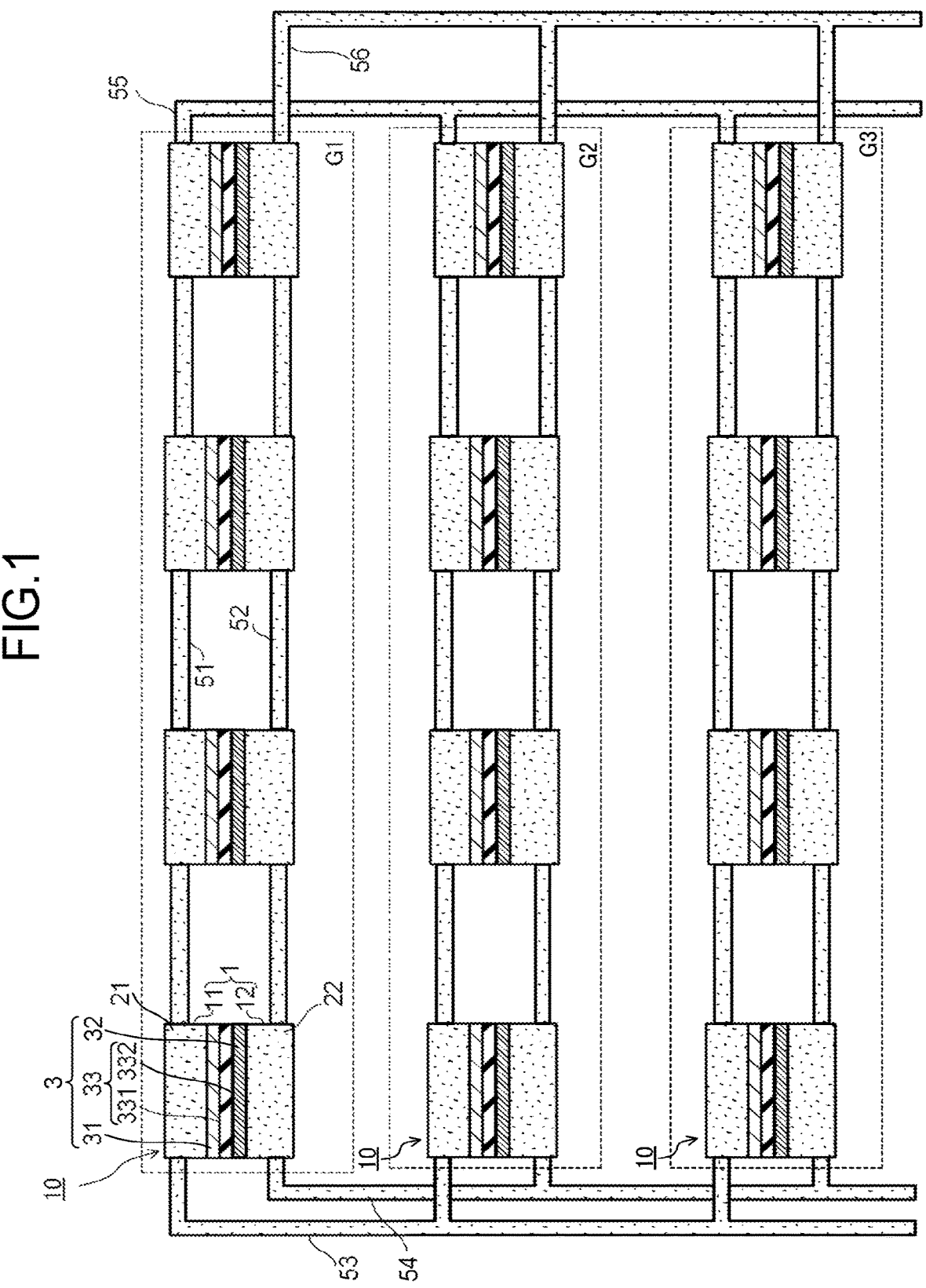
FIG. 1 is a schematic view illustrating a structure example of an electrochemical reaction device.
Figure 2:
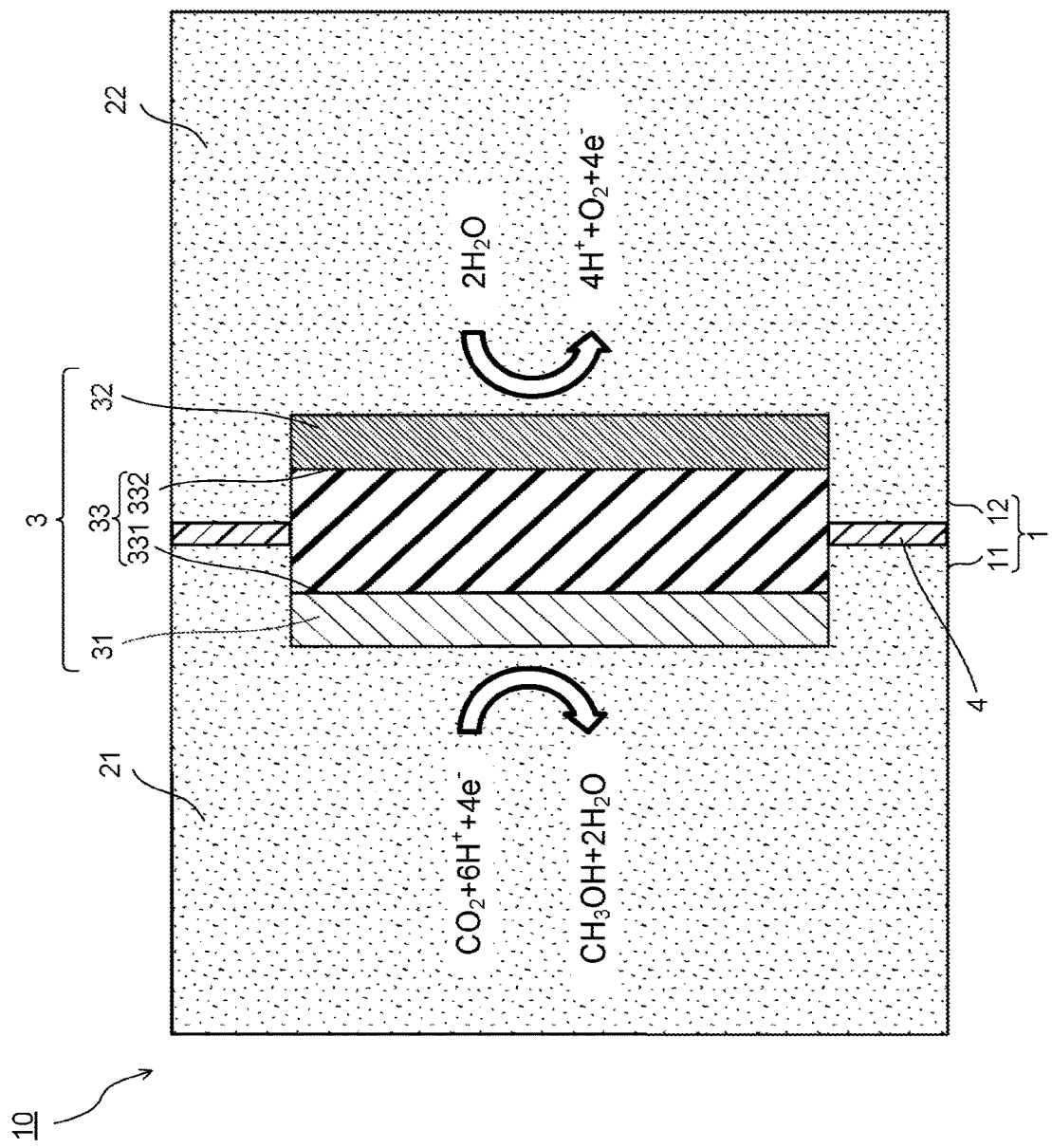
FIG. 2 is a schematic view illustrating a structure example and an operation example of an electrochemical reaction unit.

FIG. 1 is a schematic view illustrating a structure example of an electrochemical reaction device including electrochemical reaction units. FIG. 2 is a schematic view illustrating a structure example and an operation example of the electrochemical reaction unit. The electrochemical reaction device illustrated in FIG. 1 includes a plurality of electrochemical reaction units 10.

The plurality of electrochemical reaction units 10 are divided into a plurality of unit groups including a first unit group having two or more electrochemical reaction units 10 and a second unit group having two or more electrochemical reaction units 10. In FIG. 1, the plurality of electrochemical reaction units 10 are divided into three groups including a unit group G1, a unit group G2, and a unit group G3. The number of unit groups is not limited to the number illustrated in FIG. 1.

The number of electrochemical reaction units 10 in each unit group is preferably 2 or more and 20 or less. When the number of electrochemical reaction units 10 exceeds 20, an oxidation-reduction reaction is difficult to occur at a part of the electrochemical reaction units 10. In FIG. 1, each of the unit group G1 to the unit group G3 includes four electrochemical reaction units 10. The number of electrochemical reaction units 10 may be different by each unit group. The plurality of electrochemical reaction unit group may include a unit group having one electrochemical reaction unit 10. The number of electrochemical reaction units 10 of at least one of the plurality of electrochemical reaction unit group may be 2 or more and 20 or less. A size of the electrochemical reaction unit 10 is preferably 1 cm in length×1 cm in width×1 cm in height or more and 1 m in length×1 m in width×1 m in height or less. A size of the electrochemical reaction device is preferably 1 m in length×1 m in width×1 m in height or more and 5 m in length×5 m in width×5 m in height or less, more preferably 1 m in length×1 m in width×1 m in height or more and 2 m in length×2 m in width×2 m in height or less.

Each of the plurality of electrochemical reaction units 10 includes an electrolytic tank 1 having a storage part 11 and a storage part 12, and a photoelectric conversion cell 3 having a reduction electrode layer 31, an oxidation electrode layer 32, and a photoelectric conversion layer 33. The electrochemical reaction unit has a generator. The generator is electrically connected to the reduction and oxidation electrode layers. The generator is not limited to the photoelectric conversion element having the photoelectric conversion layer. Examples of the generator include a system power supply, a storage battery, or the renewable energy such as the wind power, water power, and the geothermal power.

Respective electrolytic tanks of the electrochemical reaction units 10 in the same unit group are serially connected with each other. In the electrochemical reaction units 10 in the unit group G1, respective storage parts 11 are serially connected with each other through a flow path 51, and respective storage parts 12 are serially connected with each other through a flow path 52. In the electrochemical reaction units 10 in the unit group G2, respective storage parts 11 are serially connected with each other through the flow path 51, and respective storage parts 12 are serially connected with each other through the flow path 52. In the electrochemical reaction units 10 in the unit group G3, respective storage parts 11 are serially connected with each other through the flow path 51, and respective storage parts 12 are serially connected with each other through the flow path 52. The electrochemical reaction device may include at least one flow path between the flow path 51 and the flow path 52.

The electrolytic tanks 1 which are serially connected with each other in two or more unit groups are parallelly connected with each other. For example, the storage parts 11 of the electrochemical reaction units 10 in the unit group G2 are parallelly connected to the storage parts 11 of the electrochemical reaction units 10 in the unit group G1 through the flow path 51, a flow path 53, and a flow path 55. The storage parts 12 of the electrochemical reaction units 10 in the unit group G2 are parallelly connected to the storage parts 12 of the electrochemical reaction units 10 in the unit group G1 through the flow path 52, a flow path 54, and a flow path 56. The storage parts 11 of the electrochemical reaction units 10 in the unit group G3 are parallelly connected to the storage parts 11 of the electrochemical reaction units 10 in the unit group G1 through the flow path 51, the flow path 53, and the flow path 55. The storage parts 12 of the electrochemical reaction units 10 in the unit group G3 are parallelly connected to the storage parts 12 of the electrochemical reaction units 10 in the unit group G2 through the flow path 52, the flow path 54, and the flow path 56.

Each constituent element of the electrochemical reaction device is described. The electrolytic tank 1 is not limited to a particular shape and may have a three-dimensional shape having a cavity serving as storage part. The electrochemical reaction unit 10 may further include an ion exchange membrane 4 between the storage part 11 and the storage part 12. In FIG. 2, the storage part 11 and the storage part 12 are divided by, for example, the ion exchange membrane 4 from one another. Examples of membranes usable as the ion exchange membrane 4 include NEOSEPTA (registered trademark) of ASTOM Corporation, SELEMION (registered trademark), Aciplex (registered trademark) of Asahi Glass Corporation, Ltd., Fumasep (registered trademark), fumapem (registered trademark) of Fumatech Corporation, Nafion (registered trademark) of DuPont Corporation being a fluorocarbon resin where tetrafluoroethylene is sulfonated and polymerized, lewabrane (registered trademark) of LANXESS Corporation, IONSEP (registered trademark) of IONTECH Corporation, Mustang (registered trademark) of PALL Corporation, ralex (registered trademark) of mega Corporation, and Gore-Tex (registered trademark) of Gore-Tex Corporation. The ion exchange membrane 4 may be formed of a membrane having a hydrocarbon basic skeleton or for anion exchange, may be formed of a membrane having an amine group.

The storage part 11 stores an electrolytic solution 21 containing substances to be reduced. The substances to be reduced are substances reduced by a reduction reaction. Examples of the substances to be reduced include hydrogen ions and carbon dioxide. Changing an amount of water and electrolytic solution components contained in the electrolytic solution 21 can change reactivity. This changes selectivity of the substances to be reduced and a ratio of produced chemical substances.

The storage part 12 stores an electrolytic solution 22 containing substances to be oxidized. The substances to be oxidized are substances oxidized by an oxidation reaction. Examples of the substances to be oxidized include water, an organic matter such as alcohol or amine, and inorganic oxide such as iron oxide. The electrolytic solution 22 may contain the same substances as the electrolytic solution 21. In this case, the electrolytic solution 21 and the electrolytic solution 22 may be regarded as one electrolytic solution.

A pH value of the electrolytic solution 22 is preferably higher than a pH value of the electrolytic solution 21. This enables ions such as the hydrogen ions and hydroxide ions to move easily. In addition, a liquid junction potential difference resulting from a difference in the pH values enables the oxidation-reduction reaction to proceed effectively.

The reduction electrode layer 31 is immersed in the electrolytic solution 21. The reduction electrode layer 31 contains, for example, a reduction catalyst of the substances to be reduced. Compounds produced by the reduction reaction are different depending on kinds or the like of the reduction catalyst. Example of the compound produced by the reduction reaction include: carbon compounds such as carbon monoxide (CO), formic acid (HCOOH), methane ($CH_4$), methanol ($CH_3OH$), ethane ($C_2H_6$), ethylene ($C_2H_4$), ethanol ($C_2H_5OH$), formaldehyde (HCHO), and ethylene glycol; and hydrogen. The compounds produced by the reduction reaction may be recovered through, for example, a product flow path. At this time, the product flow path is connected to, for example, the storage part 11. The compounds produced by the reduction reaction may be recovered through the flow path 51 and the flow path 55.

The reduction electrode layer 31 may have, for example, a structure in a thin-film state, a lattice state, a particle state, or a wired state. The reduction catalyst is not necessarily provided at the reduction electrode layer 31. A reduction catalyst layer provided at other than the reduction electrode layer 31 may be electrically connected to the reduction electrode layer 31.

The oxidation electrode layer 32 is immersed in the electrolytic solution 22. The oxidation electrode layer 32 contains, for example, an oxidation catalyst of the substances to be oxidized. Compounds produced by the oxidation reaction change depending on kinds or the like of the oxidation catalyst. Examples of the oxidation reaction include the hydrogen ions. The compounds produced by the oxidation reaction may be recovered through, for example, the product flow path. At this time, the product flow path is connected to, for example, the storage part 12. The compounds produced by the oxidation reaction may be recovered through the flow path 52 and the flow path 56.

The oxidation electrode layer 32 may have, for example, a structure in the thin-film state, the lattice state, the particle state, or the wired state. The oxidation catalyst is not necessarily provided at the oxidation electrode layer 32. An oxidation catalyst layer provided at other than the oxidation electrode layer 32 may be electrically connected to the oxidation electrode layer 32.

When the oxidation electrode layers 32 are stacked and immersed into the electrolytic solution 22, and the oxidation-reduction reaction is performed by irradiating light on the photoelectric conversion layer 33 through the oxidation electrode layer 32, it is necessary that the oxidation electrode layer 32 has light transmitting properties. Light transmittance of the oxidation electrode layer 32 is preferably, for example, at least 10% or more, more preferably 30% or more of an irradiation amount of the light irradiated on the oxidation electrode layer 32. For example, the light may be irradiated on the photoelectric conversion layer 33 through the reduction electrode layer 31 without being limited to the above.

The photoelectric conversion layer 33 includes a surface 331 which is electrically connected to the reduction electrode layer 31 and a surface 332 which is electrically connected to the oxidation electrode layer 32. In FIG. 2, the reduction electrode layer 31 is in contact with the surface 331, and the oxidation electrode layer 32 is in contact with the surface 332. Connections between the surface 331 and the reduction electrode layer 31, and between the surface 332 and the oxidation electrode layer 32 may be established by, for example, wiring having heat transfer properties without being limited to the above. When the photoelectric conversion layer and the reduction electrode layer or the oxidation electrode layer are connected by the wiring or the like, components are separated by each function, and therefore, it is systematically advantageous. The photoelectric conversion layer 33 may be provided outside the electrolytic tank 1.

The photoelectric conversion layer 33 has a function performing charge separation by the irradiated light energy of the sunlight or the like. Electrons generated by the charge separation move toward the reduction electrode layer side, and positive holes move toward the oxidation electrode side. Therefore, the photoelectric conversion layer 33 enables to generate electromotive force. For example, a pn junction type or a pin junction type photoelectric conversion layer can be used as the photoelectric conversion layer 33. The photoelectric conversion layer 33 may be fixed to, for example, the electrolytic tank 1. the photoelectric conversion layer 33 may be formed by stacking a plurality of photoelectric conversion layers.

Sizes of the reduction electrode layer 31, the oxidation electrode layer 32, and the photoelectric conversion layer 33 may be different from one another.

The flow path 51 to the flow path 56 each have a function as an electrolytic solution flow path to pass the electrolytic solution. The function is not limited thereto, and the electrolytic solution and the product by the oxidation-reduction reaction may be passed through the flow path 51 to the flow path 56. For example, a material which transmits light may be used as the electrolytic tank 1 and the flow path 51 to the flow path 56.

The flow path 51 serially connects one storage part 11 of the electrolytic tank 1 and another storage part 11 of the electrolytic tank 1 in the same unit group. The flow path 52 serially connects one storage part 12 of the above-stated electrolytic tank 1 and another storage part 12 of the above-stated electrolytic tank 1. Ions and the other substances contained in the electrolytic solution 21 are able to move among each of the electrolytic tanks 1 of the electrochemical reaction units 10 in the same unit group through the flow path 51, the flow path 53, and the flow path 55. Ions and the other substances contained in the electrolytic solution 22 are able to move among each of the electrolytic tanks 1 of the electrochemical reaction units 10 in the same unit group through the flow path 52, the flow path 54, and the flow path 56.

A length of the flow path 52 may be different from or the same as a length of the flow path 51. At least one of the flow path 51 and the flow path 52 may be provided at the electrochemical reaction device.

Shapes of the flow path 51 and the flow path 52 are not particularly limited as long as they each have a hollow capable of passing the electrolytic solution such as a pipe. The electrolytic solution in at least one flow path of the flow path 51 and the flow path 52 may be circulated by providing a circulating pump.

The flow path 53 is serially connected to the storage parts 11 of the serially connected electrolytic tanks 1 in each unit group. The electrolytic solution containing the substances to be reduced is supplied to the storage parts 11 of the serially connected electrolytic tanks 1 through the flow path 53. In the storage parts 11 of the plurality of electrochemical reaction units 10, the electrolytic solution containing the substances to be reduced is preferably supplied to the plurality of electrochemical reaction units 10 by an electrolytic solution supply part or the like such that an amount of the substances to be reduced contained in the electrolytic solution 21 is twice or more of an amount of the substances to be reduced consumed by the reduction reaction. Complete replacement is thereby possible in case of an ideal replacement. At this time, the flow path 53 connects between the electrolytic solution supply part and the storage parts 11 of the serially connected electrolytic tanks 1 in each unit group. Further, the electrolytic solution containing the substances to be reduced is more preferably supplied to the electrochemical reaction units 10 such that the amount of the substances to be reduced contained in the electrolytic solution 21 is three times or more of the amount of the substances to be reduced consumed by the reduction reaction. Execution of a supply operation of the electrolytic solution containing the substances to be reduced is controlled by, for example, a control circuit provided at the electrolytic solution supply part.

The flow path 54 is serially connected to the storage parts 12 of the serially connected electrolytic tanks 1 in each unit group. The electrolytic solution containing the substances to be oxidized is supplied to the storage parts 12 of the serially connected electrolytic tanks 1 through the flow path 54. In the storage parts 12 of the plurality of electrochemical reaction units 10, the electrolytic solution containing the substances to be oxidized is preferably supplied to the plurality of electrochemical reaction units 10 by the electrolytic solution supply part or the like such that an amount of the substances to be oxidized contained in the electrolytic solution 22 is twice or more of an amount of the substances to be oxidized consumed by the oxidation reaction. Complete replacement is thereby possible in case of the ideal replacement. At this time, the flow path 54 connects between the electrolytic solution supply part and the storage parts 12 of the serially connected electrolytic tanks 1 in each unit group. Further, the electrolytic solution containing the substances to be oxidized is more preferably supplied to the electrochemical reaction units 10 such that the amount of the substances to be oxidized contained in the electrolytic solution 22 is three times or more of the amount of the substances to be oxidized consumed by the oxidation reaction. Execution of a supply operation of the electrolytic solution containing the substances to be oxidized is controlled by, for example, the control circuit provided at the electrolytic solution supply part.

The flow path 55 is serially connected to the storage parts 11 of the serially connected electrolytic tanks 1 in each unit group. At least a part of the electrolytic solution 21 is discharged from the storage parts 11 of the serially connected electrolytic tanks 1 through the flow path 55. The flow path 56 is serially connected to the storage parts 12 of the serially connected electrolytic tanks 1. At least a part of the electrolytic solution 22 is discharged from the storage parts 12 of the serially connected electrolytic tanks 1 through the flow path 56.

Next, an operation example of the electrochemical reaction device is described with reference to FIG. 2. When the light is incident on the photoelectric conversion layer 33, the photoelectric conversion layer 33 generates photoexcited electrons and positive holes. At this time, the photoexcited electrons are collected at the reduction electrode layer 31, and the positive holes are collected at the oxidation electrode layer 32. The electromotive force is thereby generated at the photoelectric conversion layer 33. As the light, the sunlight is preferable, but light of light-emitting diode, organic EL, and so on may be incident on the photoelectric conversion layer 33.

The following describes a case where electrolytic solutions containing water and carbon dioxide are used as the electrolytic solution 21 and the electrolytic solution 22 and methanol is produced. Around the oxidation electrode layer 32, as expressed by the following equation (1), the water undergoes an oxidation reaction and loses electrons, so that oxygen and hydrogen ions are produced. At least one of the produced hydrogen ions migrates to the storage part 11 through the ion exchange membrane 4.

$$2H_2O \rightarrow 4H^+ + O_2 + 4e^- \tag{1}$$

Around the reduction electrode layer 31, as expressed by the following equation (2), the carbon dioxide undergoes a reduction reaction and the hydrogen ions react with the carbon dioxide while receiving the electrons, so that methanol and water are produced. The methanol dissolves in the electrolytic solution 21 at an optional ratio. Further, in addition to the methanol, hydrogen is produced by the hydrogen ions receiving the electrons as expressed by the following equation (3). At this time, the hydrogen may be produced simultaneously with the methanol.

$$CO_2 + 6H^+ + 4e^- \rightarrow CH_3OH + H_2O \tag{2}$$

$$2H^+ + 2e^- \rightarrow H_2 \tag{3}$$

The photoelectric conversion layer 33 needs to have an open-circuit voltage equal to or larger than a potential difference between a standard oxidation-reduction potential of the oxidation reaction and a standard oxidation-reduction potential of the reduction reaction. For example, the standard oxidation-reduction potential of the oxidation reaction in the equation (1) is 1.23 [V]. The standard oxidation-reduction potential of the reduction reaction in the equation (2) is 0.03 [V]. The standard oxidation-reduction potential of the oxidation reaction in the equation (3) is 0 [V]. At this time, in the reactions of the equation (1) and the equation (2), the open-circuit voltage needs to be 1.26 [V] or higher.

The open-circuit voltage of the photoelectric conversion layer 33 is preferably higher than the potential difference between the standard oxidation-reduction potential of the oxidation reaction and the standard oxidation-reduction potential of the reduction reaction by a value of overvoltage or more. For example, the overvoltages of the oxidation reaction in the equation (1) and the reduction reaction in the equation (2) are both 0.2 [V]. In the reactions of the equation (1) and the equation (2), the open-circuit voltage is preferably 1.66 [V] or higher. Similarly, in the reactions of the equation (1) and the equation (3), the open-circuit voltage is preferably 1.63 V or higher.

The reduction reactions of the hydrogen ions and carbon dioxide are the reactions consuming the hydrogen ions. This means that a small amount of the hydrogen ions results in low efficiency of the reduction reaction. So, the electrolytic solution 21 and the electrolytic solution 22 preferably have different hydrogen ion concentrations so that the concentration difference facilitates the migration of the hydrogen ions. The concentration of negative ions (for example, hydroxide ions) may be different between the electrolytic solution 21 and the electrolytic solution 22.

The electrochemical reaction device of the embodiment includes the plurality of electrochemical reaction units divided into the plurality of unit groups. The electrochemical reaction units in the same group are serially connected with each other. The serially connected two or more electrochemical reaction units in one unit group are parallelly connected to the serially connected two or more electrochemical reaction units in another unit group.

The pH value of the electrolytic solution 21 decreases due to the oxidation-reduction reaction. The pH value of the electrolytic solution 22 increases. A liquid junction potential of 60 mV is generated every time when a difference in the pH values increases one. Accordingly, the potential of the electrolytic solution becomes small as the oxidation-reduction reaction proceeds, and the reaction becomes difficult to occur.

For example, when the electrolytic tanks 1 of the plurality of electrochemical reaction units 10 are serially connected, and not parallelly connected, the pH value of the electrolytic solution 21 of the electrolytic tank 1 at a subsequent stage is higher than that of the electrolytic solution 21 of the electrolytic tank 1 at a previous stage. The pH value of the electrolytic solution 22 of the electrolytic tank 1 at a subsequent stage is lower than that of the electrolytic solution 22 of the electrolytic tank 1 at a previous stage. Accordingly, a reaction amount of the reduction reaction in the electrolytic tank 1 at the subsequent stage is smaller than that of the reduction reaction in the electrolytic tank 1 at the previous stage. A reaction amount of the oxidation reaction in the electrolytic tank 1 at the subsequent stage is smaller than that of the oxidation reaction in the electrolytic tank 1 at the previous stage.

When the electrolytic tanks 1 of the plurality of electrochemical reaction units 10 are not serially connected but parallelly connected, a total flow path lengthens, and a device area and a manufacturing cost may increase. There is a possibility that a difference occurs in flow rates of the supplied electrolytic solution by the electrolytic tanks. For example, when a pressure loss in the flow path is different by each the electrolytic tank, variation occurs in the flow rates of the electrolytic solution. When gas produced by the oxidation-reduction reaction and the electrolytic solution are supplied through the same flow path, a multiphase flow such as a gas-liquid two-phase flow occurs in the flow path, and the pressure loss becomes large. At a part where the reaction amount is large, the pressure loss becomes large. A supplied electrolytic solution amount is therefore small. At a part where the reaction amount is small, a generation amount of gas is small, and the pressure loss is small. The supplied electrolytic solution amount is therefore large.

Accordingly, the supplied electrolytic solution amount is small at a part where a large amount of electrolytic solution is required, and the supplied electrolytic solution amount is large at a part where a small amount of electrolytic solution is required. Variation in the supply amount of the electrolytic solution occurs due to air bubbles produced by the oxidation-reduction reaction, a change in viscosity of the electrolytic solution due to a change in concentration, and a change in the reaction amount due to a change in an incident light amount.

In the electrochemical reaction device of the embodiment, the plurality of electrochemical reaction units are divided into the plurality of unit groups, the electrolytic tanks of the electrochemical reaction units in the same unit group are serially connected, and the electrolytic tanks of the electrochemical reaction units in the different unit groups are parallelly connected. This shortens the length of the flow path and suppressing the variation in the reaction to suppress the increase in the device area, and to reduce the manufacturing cost. Therefore, the conversion efficiency from light to chemical substances increases. The storage part 11 of the electrochemical reaction unit 10 and the storage part 12 of another electrochemical reaction unit 10 may be connected to adjust a balance of the pH values. The electrochemical reaction device may include a structure where a connection destination of the storage part 11 of one electrochemical reaction unit 10 is switched between the storage part 11 or the storage part 12 of another electrochemical reaction unit 10 depending on a difference in the reaction amounts. It is thereby possible to increase flexibility, and to be easy to correspond to decrease in the reaction amount and deterioration in the electrolytic solution.

A structure example of each constituent element in the electrochemical reaction device is further described. As the water-containing electrolytic solution usable as the electrolytic solution, an aqueous solution containing a desired electrolyte is usable, for instance. This solution is preferably an aqueous solution that accelerates the oxidation reaction of water. Examples of the aqueous solution containing the electrolyte include aqueous solutions containing phosphate ions ($PO_4^{2-}$), borate ions ($BO_3^{3-}$), sodium ions ($Na^+$), potassium ions ($K^+$), calcium ions ($Ca^{2+}$), lithium ions ($Li^+$), cesium ions ($Cs^+$), magnesium ions ($Mg^{2+}$), chloride ions ($Cl^-$), and hydrogen carbonate ions ($HCO_3^-$).

Examples of the electrolytic solution containing carbon dioxide usable as the electrolytic solution include aqueous solutions containing $LiHCO_3$, $NaHCO_3$, $KHCO_3$, $CsHCO_3$, phosphoric acid, and boric acid. The carbon dioxide-containing electrolytic solution may contain alcohol such as methanol, ethanol, or acetone. The water-containing electrolytic solution may be the same as the carbon dioxide-containing electrolytic solution. However, an absorption amount of carbon dioxide in the carbon dioxide-containing electrolytic solution is preferably high. So, a solution different from the water-containing electrolytic solution may be used as the carbon dioxide-containing electrolytic solution. The carbon dioxide-containing electrolytic solution is preferably an electrolytic solution that lowers a reduction potential of carbon dioxide, has high ion conductivity, and contains a carbon dioxide absorbent that absorbs carbon dioxide.

As the aforesaid electrolytic solution, an ionic liquid that contains salt of cations such as imidazolium ions or pyridinium ions and anions such as $BF_4^-$ or $PF_6^-$ and is in a liquid state in a wide temperature range, or its aqueous solution is usable, for instance. Other examples of the electrolytic solution include solutions of amine such as ethanolamine, imidazole, and pyridine, and aqueous solutions thereof. Examples of the amine include primary amine, secondary amine, and tertiary amine. These electrolytic solutions may be high in ion conductivity, have a property of absorbing carbon dioxide, and have a characteristic of lowering reduction energy.

Examples of the primary amine include methylamine, ethylamine, propylamine, butylamine, pentylamine, and hexylamine. Hydrocarbons of the amine may be substituted by alcohol, halogen, and so on. Examples of the substituted amine includes methanolamine, ethanolamine, and chloromethyl amine. Further, an unsaturated bond may be present. The same thing can be said for hydrocarbons of the secondary amine and the tertiary amine.

Examples of the secondary amine include dimethylamine, diethylamine, dipropylamine, dibutylamine, dipentylamine, dihexylamine, dimethanolamine, diethanolamine, and dipropanolamine. The replaced hydrocarbons may be different. This is also the same for the tertiary amine. Examples of the amine having different hydrocarbons include methylethylamine and methylpropylamine.

Examples of the tertiary amine include trimethylamine, triethylamine, tripropylamine, tributylamine, trihexylamine, trimethanolamine, triethanolamine, tripropanolamine, tributanolamine, tripropanolamine, triexanolamine, methyldiethylamine, and methyldipropylamine.

Examples of the cation of the ionic liquid include a 1-ethyl-3-methylimidazolium ion, a 1-methyl-3-propylimidazolium ion, a 1-butyl-3-methylimidazole ion, a 1-methyl-3-pentylimidazolium ion, and a 1-hexyl-3-methylimidazolium ion.

The position 2 of the imidazolium ion may be replaced. Examples of the cation which is the imidazolium ion having the replaced position 2 include a 1-ethyl-2,3-dimethylimidazolium ion, a 1,2-dimethyl-3-propylimidazolium ion, a 1-butyl-2,3-dimethylimidazolium ion, a 1,2-dimethyl-3-pentylimidazolium ion, and a 1-hexyl-2,3-dimethylimidazolium ion.

Examples of the pyridinium ion include methylpyridinium, ethylpyridinium, propylpyridinium, butylpyridinium, pentylpyridinium, and hexylpyridinium. In the imidazolium ion and the pyridinium ion, an alkyl group may be replaced, and an unsaturated bond may be present.

Examples of the anion include a fluoride ion, a chloride ion, a bromide ion, an iodide ion, $BF_4^-$, $PF_6^-$, $CF_3COO^-$, $CF_3SO3^-$, $NO_3^-$, $SCN^-$, $(CF_3SO_2)_3C^-$, bis(trifluoromethoxysulfonyl)imide, bis(trifluoromethoxysulfonyl)imide, and bis(perfluoroethylsulfonyl)imide. It may be a dipolar ion in which the cations and the anions of the ionic liquid are coupled by hydrocarbons. Incidentally, a buffer solution such as a potassium phosphate solution may be supplied to the storage parts 11, 12.

Figure 3:
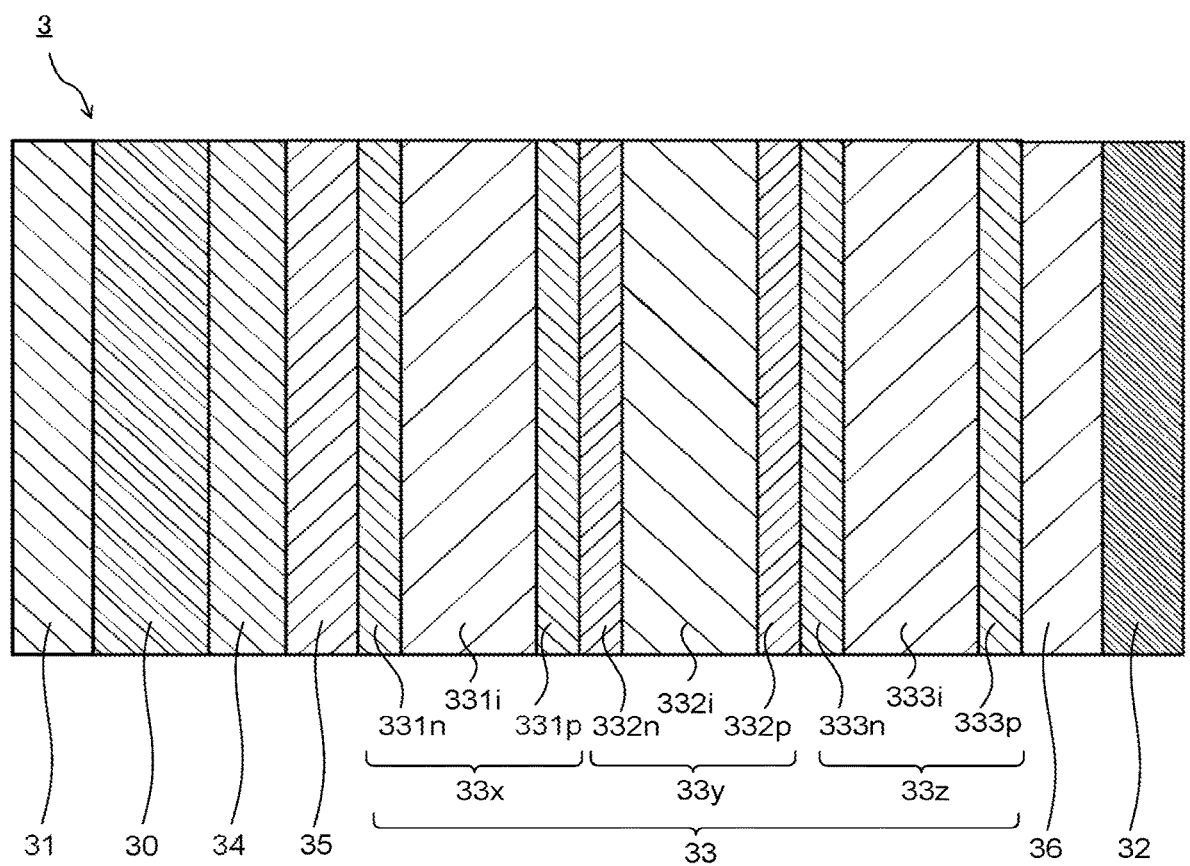
FIG. 3 is a schematic view illustrating a structure example of a photoelectric conversion cell.

FIG. 3 is a schematic sectional view illustrating a structure example of a photoelectric conversion cell. The photoelectric conversion cell 3 illustrated in FIG. 3 includes a conductive substrate 30, the reduction electrode layer 31, the oxidation electrode layer 32, the photoelectric conversion layer 33, a light reflection layer 34, a metal oxide layer 35, and a metal oxide layer 36.

The conductive substrate 30 is provided to be in contact with the reduction electrode layer 31. The conductive substrate 30 may be regarded as a part of the reduction electrode layer. Examples of the conductive substrate 30 include a substrate containing at least one or a plural from among Cu, Al, Ti, Ni, Fe, and Ag. For example, a stainless substrate containing a stainless steel such as SUS may be used. The conductive substrate 30 is not limited thereto, and may be made up by using a conductive resin. The conductive substrate 30 may be formed using a semiconductor substrate such as Si or Ge. Further, a film such as a resin film may be used as the conductive substrate 30. For example, a membrane applicable for the ion exchange membrane 4 may be used as the conductive substrate 30.

The conductive substrate 30 has a function as a supporter. The conductive substrate 30 may be provided so as to separate between the storage part 11 and the storage part 12. The conductive substrate 30 improves mechanical strength of the photoelectric conversion cell 3. The conductive substrate 30 may be regarded as a part of the reduction electrode layer 31. Further, the conductive substrate 30 is not necessarily provided.

The reduction electrode layer 31 preferably contains the reduction catalyst. The reduction electrode layer 31 may contain both a conductive material and the reduction catalyst. Examples of the reduction catalyst include materials reducing activation energy to reduce the hydrogen ions and carbon dioxide. In other words, a material that lowers overvoltage when a carbon compound is produced by the reduction reaction of carbon dioxide is usable. For example, a metal material or a carbon material is usable. For example, a metal such as gold, aluminum, copper, silver, platinum, palladium, or nickel, or an alloy containing this metal is usable as the metal material. As the carbon material, graphene, carbon nanotube (CNT), fullerene, or ketjen black is usable, for instance. The reduction catalyst is not limited to these, and may be, for example, a metal complex such as a Ru complex or a Re complex, or an organic molecule having an imidazole skeleton or a pyridine skeleton or may be a mixture of a plurality of materials.

The oxidation electrode layer 32 preferably contains an oxidation catalyst. The oxidation electrode layer 32 may contain both a conductive material and the oxidation catalyst. Examples of the oxidation catalyst include a material that decreases activation energy for oxidizing water. In other words, it may be a material that lowers overvoltage when oxygen and hydrogen ions are produced by the oxidation reaction of water.

Examples thereof include iridium, platinum, cobalt, and manganese. Further, as the oxidation catalyst, a binary metal oxide, a ternary metal oxide, or a quaternary metal oxide is usable, for instance. Examples of the binary metal oxide include manganese oxide (Mn—O), iridium oxide (Ir—O), nickel oxide (Ni—O), cobalt oxide (Co—O), iron oxide (Fe—O), tin oxide (Sn—O), indium oxide (In—O), and ruthenium oxide (Ru—O). Examples of the ternary metal oxide include Ni—Co—O, La—Co—O, Ni—La—O, and Sr—Fe—O. Examples of the quaternary metal oxide include Pb—Ru—Ir—O and La—Sr—Co—O. The oxidation catalyst is not limited to these, and a metal complex such as a Ru complex or a Fe complex is usable as the oxidation catalyst. Further, a mixture of a plurality of materials may also be used.

At least one of the reduction electrode layer 31 and the oxidation electrode layer 32 may have a porous structure. Examples of a material usable as the electrode layer having the porous structure include, in addition to the above-listed materials, carbon black such as ketjen black and VULCAN XC-72, activated carbon, and metal fine powder. The porous structure can increase the area of an active surface contributing to the oxidation-reduction reaction and thus can increase conversion efficiency.

In a case where an electrode reaction with a low current density is caused using relatively low irradiation energy of light, the catalyst material can be selected from a wide range of options. Accordingly, it is easy to cause the reaction using, for example, a ubiquitous metal, and it is also relatively easy to obtain selectivity of the reaction. On the other hand, in a case where the photoelectric conversion layer 33 is not disposed in the electrolytic solution tank 1 and is electrically connected to at least one of the reduction electrode layer 31 and the oxidation electrode layer 32 by, for example, a wiring line, the electrode area usually decreases due to a reason such as the downsizing of the electrolytic solution tank, and the reaction is sometimes caused with a high current density. In this case, a noble metal is preferably used as the catalyst.

The photoelectric conversion layer 33 has a stacked structure including a photoelectric conversion layer 33$x$, a photoelectric conversion layer 33$y$, and a photoelectric conversion layer 33$z$. The number of stacks of the photoelectric conversion layers is not limited to the one illustrated in FIG. 3.

The photoelectric conversion layer 33$x$ includes, for example, an n-type semiconductor layer 331$n$ containing n-type amorphous silicon, an i-type semiconductor layer 331$i$ containing intrinsic amorphous silicon germanium, and a p-type semiconductor layer 331$p$ containing p-type microcrystal silicon. The i-type semiconductor layer 331$i$ is a layer which absorbs light in a short wavelength region including, for example, 400 nm. Accordingly, charge separation occurs at the photoelectric conversion layer 33$x$ due to the light energy in the short wavelength region.

The photoelectric conversion layer 33$y$ includes, for example, an n-type semiconductor layer 332$n$ containing n-type amorphous silicon, an i-type semiconductor layer 332$i$ containing intrinsic amorphous silicon germanium, and a p-type semiconductor layer 332$p$ containing p-type microcrystal silicon. The i-type semiconductor layer 332$i$ is a layer which absorbs light in an intermediate wavelength region including, for example, 600 nm. Accordingly, the charge separation occurs at the photoelectric conversion layer 33y due to the light energy in the intermediate wavelength region.

The photoelectric conversion layer 33z includes, for example, an n-type semiconductor layer 333n containing n-type amorphous silicon, an i-type semiconductor layer 333i containing intrinsic amorphous silicon, and a p-type semiconductor layer 333p containing p-type microcrystal silicon. The i-type semiconductor layer 333i is a layer which absorbs light in a long wavelength region including, for example, 700 nm. Accordingly, the charge separation occurs at the photoelectric conversion layer 33z due to the light energy in the long wavelength region.

The p-type semiconductor layers or the n-type semiconductor layers each can be formed of, for example, a semiconductor material to which an element that is to be a donor or an acceptor is added. Incidentally, in the photoelectric conversion layer, semiconductor layers containing silicon, germanium, or the like are used as the semiconductor layers, but this is not restrictive, and compound semiconductor layers are usable, for instance. As the compound semiconductor layers, semiconductor layers containing, for example, GaAs, GaInP, AlGaInP, CdTe, or CuInGaSe are usable, for instance. Further, layers containing a material such as $TiO_2$ or $WO_3$ may be used, provided that photoelectric conversion is possible. Further, the semiconductor layers each may be monocrystalline, polycrystalline, or amorphous. Further, the photoelectric conversion layer may include a zinc oxide layer.

The light reflection layer 34 is between the conductive substrate 30 and the photoelectric conversion layer 33. Examples of the light reflection layer 34 include a distributed Bragg reflection layer composed of a stack of metal layers or semiconductor layers, for instance. Owing to the presence of the light reflection layer 34, light that cannot be absorbed by the photoelectric conversion layer 33 can be reflected to enter one of the photoelectric conversion layer 33x to the photoelectric conversion layer 33z, enabling to enhance conversion efficiency from light to a chemical substance. As the light reflection layer 34, a layer of a meal such as Ag, Au, Al, or Cu or an alloy containing at least one of these metals is usable.

The metal oxide layer 35 is between the light reflection layer 34 and the photoelectric conversion layer 33. The metal oxide layer 35 has a function of enhancing light reflectivity by adjusting an optical distance, for instance. As the metal oxide layer 35, a material capable of ohmic contact with the n-type semiconductor layer 331n is preferable used. As the metal oxide layer 35, a layer of a transparent metal oxide such as, for example, indium tin oxide (ITO), zinc oxide (ZnO), fluorine-doped tin oxide (FTO), aluminum-doped zinc oxide (AZO), or antimony-doped tin oxide (ATO) is usable.

The metal oxide layer 36 is between the oxidation electrode layer 32 and the photoelectric conversion layer 33. The metal oxide layer 36 may be provided on a surface of the photoelectric conversion layer 33. The metal oxide layer 36 has a function as a protection layer preventing the photoelectric conversion cell 3 from being broken by the oxidation reaction. The presence of the metal oxide layer 36 can impede the corrosion of the photoelectric conversion layer 33 to increase the life of the photoelectric conversion cell 3. The metal oxide layer 36 does not necessarily have to be provided.

As the metal oxide layer 36, a dielectric thin film of $TiO_2$, $ZrO_2$, $Al_2O_3$, $SiO_2$, or $HfO_2$ is usable, for instance. The metal oxide layer 36 preferably has a thickness of 10 nm or less, further 5 nm or less. This is intended to obtain conductivity by a tunnel effect. As the metal oxide layer 36, a layer of a metal oxide having a light transmitting property such as, for example, indium tin oxide (ITO), zinc oxide (ZnO), fluorine-doped tin oxide (FTO), aluminum-doped zinc oxide (AZO), or antimony-doped tin oxide (ATO) may be used.

The metal oxide layer 36 may have, for example, a stacked structure of a metal and a transparent conductive oxide, a composite structure of a metal and another conductive material, or a composite structure of a transparent conductive oxide and another conductive material. The above structure can decrease the number of parts, decrease the weight, and facilitate the manufacture, enabling cost reduction. The metal oxide layer 36 may have functions as a protection layer, a conductive layer, and a catalyst layer.

In the photoelectric conversion cell 3 illustrated in FIG. 3, a surface of the n-type semiconductor layer 331n opposite to a contact surface with the i-type semiconductor layer 331i becomes a first surface of the photoelectric conversion layer 33, and a surface of the p-type semiconductor layer 333p opposite to a contact surface with the i-type semiconductor layer 333i becomes a second surface. The photoelectric conversion cell 3 illustrated in FIG. 3 has a stack of layers including the photoelectric conversion layer 33x to the photoelectric conversion layer 33z. This absorbs the light in wide wavelength range of the sunlight to more effectively use the solar energy. At this time, respective photoelectric conversion layers are serially connected, therefore, the photoelectric conversion cell 3 generates high voltage.

In FIG. 3, electrons and holes having undergone the charge separation can be used as they are in the oxidation-reduction reaction, since the electrode layers are stacked on the photoelectric conversion layer 33. Further, the photoelectric conversion layer 33 and the electrode layers need not be electrically connected by wiring lines or the like. This enables the high-efficiency oxidation-reduction reaction.

A plurality of photoelectric conversion layers may be electrically connected in a parallel connection. A two-junction type and a single-junction type photoelectric conversion layer may be used. A stack of two layers or four layers or more of the photoelectric conversion layers may be held. A single layer photoelectric conversion layer may be used instead of the stack of the plurality of photoelectric conversion layers.

In the electrochemical reaction device of the embodiment, the reduction electrode layer, the oxidation electrode layer, and the photoelectric conversion layer are integrated, the number of parts is reduced and the device is a simplified system. Accordingly, for example, at least any one of manufacturing, installation, and maintenance becomes easy. Further, wirings or the like connecting the photoelectric conversion layer with the reduction electrode layer and the oxidation electrode layer become unnecessary. This increases the light transmittance, and enlarge a light receiving area.

The photoelectric conversion layer 33 is in contact with the electrolytic solution, which may lead to their corrosion and the dissolving of corrosive products in the electrolytic solution to deteriorate the electrolytic solution. The electrochemical reaction device may have a protection layers to prevent the corrosion. However, components of the protection layers may dissolve in the electrolytic solutions. Here, providing filters such as metal ion filters in the flow paths or the electrolytic solution tanks impedes the deterioration of the electrolytic solution.

The electrochemical reaction device of the embodiment is a technology suitable for measures for excess power, and it is demanded to make use of solar energy. When illuminance of sunlight is strong, energy is obtained as much as possible in case when there is not the excess power and the energy is used for the electrolytic solution circulation or the like for consumption when there is the excess power. Energy mix is thereby effectively implemented. This increases an energy utilization ratio as a total. When a buffer solution is used for the electrolytic solution, a change of the pH value due to the reaction is small when the reaction amount is small. It is therefore possible to suppress lowering of total efficiency and cost by circulating the electrolytic solution when the reaction is not performed to keep the electrolytic solution component uniform, and by limiting or stopping the supply of the electrolytic solution at the reaction time. For example, the oxidation-reduction reaction is preferably performed under a state where the electrolytic solution is circulated by using wind power at night or the excess power in low cost, the electrolytic solution circulation is stopped or the reaction is performed at a minimum supply amount in daytime.

Figure 4:
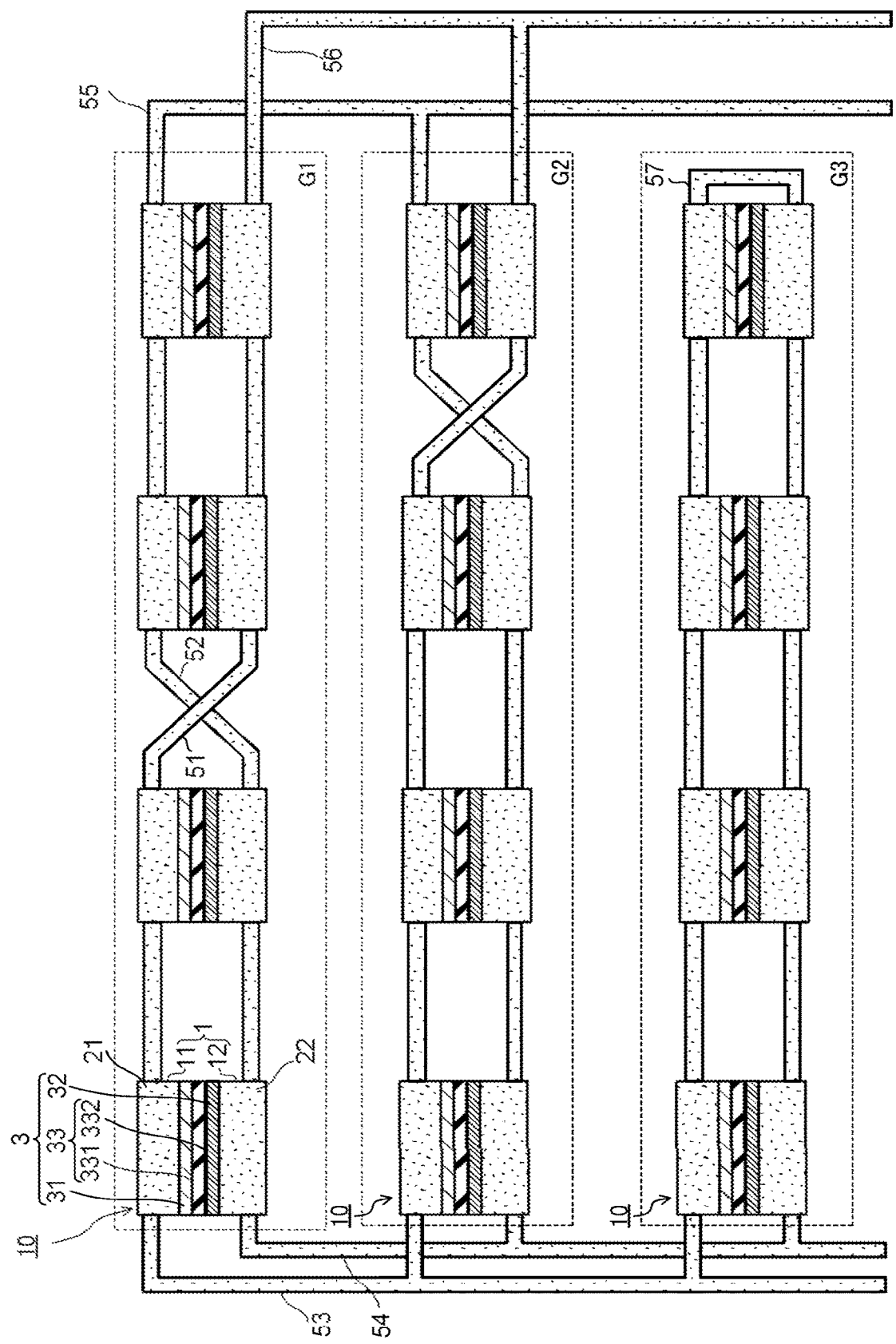
FIG. 4 is a schematic view illustrating another structure example of the electrochemical reaction device.

The electrochemical reaction device of the embodiment is not limited to the structure illustrated in FIG. 1. FIG. 4 is a schematic view illustrating another example of the electrochemical reaction device. The electrochemical reaction device illustrated in FIG. 4 has a different structure compared to the electrochemical reaction device illustrated in FIG. 1 in a point that there are provided at least one of the plurality of flow paths 51 connects between one storage part 11 of the plurality of electrolytic tanks 1 and another storage part 12 of the plurality of electrolytic tanks 1 which are serially connected to one of the plurality of electrolytic tanks 1, and at least one of the plurality of flow paths 52 connects between one storage part 12 of the plurality of electrolytic tanks 1 and another storage part 11 of the plurality of electrolytic tanks 1 which are serially connected to one of the plurality of electrolytic tanks 1. In FIG. 4, the flow path 52 intersects with the flow path 51. It is thereby possible to reduce an installation area of the flow path 51 and the flow path 52. At least one of the plurality of flow paths 52 is may provided in the electrochemical reaction device to connect between one storage part 12 of the plurality of electrolytic tanks 1 and another storage part 11 of the plurality of electrolytic tanks 1 which are serially connected to one of the plurality of electrolytic tanks 1.

It is thereby possible to mix the electrolytic solution having a high pH value and the electrolytic solution having a low pH value to reduce a difference in the pH values of the first electrolytic solutions with each other and a difference in the pH values of the second electrolytic solutions with each other in the plurality of electrolytic tanks. Accordingly, it becomes possible to increase, for example, the conversion efficiency from the light to the chemical substances. The electrolytic tank where the oxidation reaction occurs and the electrolytic tank where the reduction reaction occurs are connected through the flow paths to thereby enable moving of the electrolytic solutions between the electrolytic tanks, and thereby, effects due to the changes in the pH values, the electrolytic solution component, and so on are suppressed. This increases the conversion efficiency in an overall device.

The electrochemical reaction device illustrated in FIG. 4 has a different structure compared to the electrochemical reaction device illustrated in FIG. 1 in a point that a flow path 57 connecting between the storage part 11 and the storage part 12 is included. In FIG. 4, the flow path 57 serially connects the flow path 51 and the flow path 52. At this time, the electrolytic solution supplied through the flow path 53 moves among the flow path 51, the flow path 57, the flow path 52, and the flow path 54. This circulates the electrolytic solution. The flow path 57 may be provided by each electrolytic tank 1.

There is a case when amounts of incident light are different by the photoelectric conversion layers depending on weather or the like. At this time, a difference in reaction amounts occurs among the serially connected electrolytic tanks 1. Accordingly, there are cases when elution of metal ions from a catalyst, deterioration of members such as the electrolytic tank, the flow path, and lowering of efficiency are incurred resulting from the difference in the pH values.

When the electrolytic solution is circulated among the serially connected electrolytic tanks 1, the pH value of the electrolytic solution 21 decreases and the pH value of the electrolytic solution 22 increases when the amount of light incident on the photoelectric conversion layer 33 is large. There is a case when total efficiency is lowered if the electrolytic solution in one electrolytic tank is supplied to another electrolytic tank.

On the other hand, the flow path 57 is provided, and thereby, the electrolytic solution 21 and the electrolytic solution 22 are circulated. It is thereby possible to reduce the difference in the reaction amounts. It is preferable that the pH values of the electrolytic solution 21 and the electrolytic solution 22 are adjusted to be in a range of for example, 3 or more and 11 or less from viewpoints of corrosion and environment. The pH values of the electrolytic solution 21 and the electrolytic solution 22 are preferably not 7.

The electrochemical reaction device illustrated in FIG. 4 may include a sensor which acquires data indicating at least one state from among a temperature, a flow rate, and a pressure of the electrolytic solution flowing in the flow path 57, and an adjuster which adjusts the state of the electrolytic solution in accordance with the data.

The electrochemical reaction device may further include a carbon dioxide supply part which supplies carbon dioxide to the electrolytic solution 21 stored in at least one storage part 11 of the plurality of electrolytic tanks 1.

Figure 5:
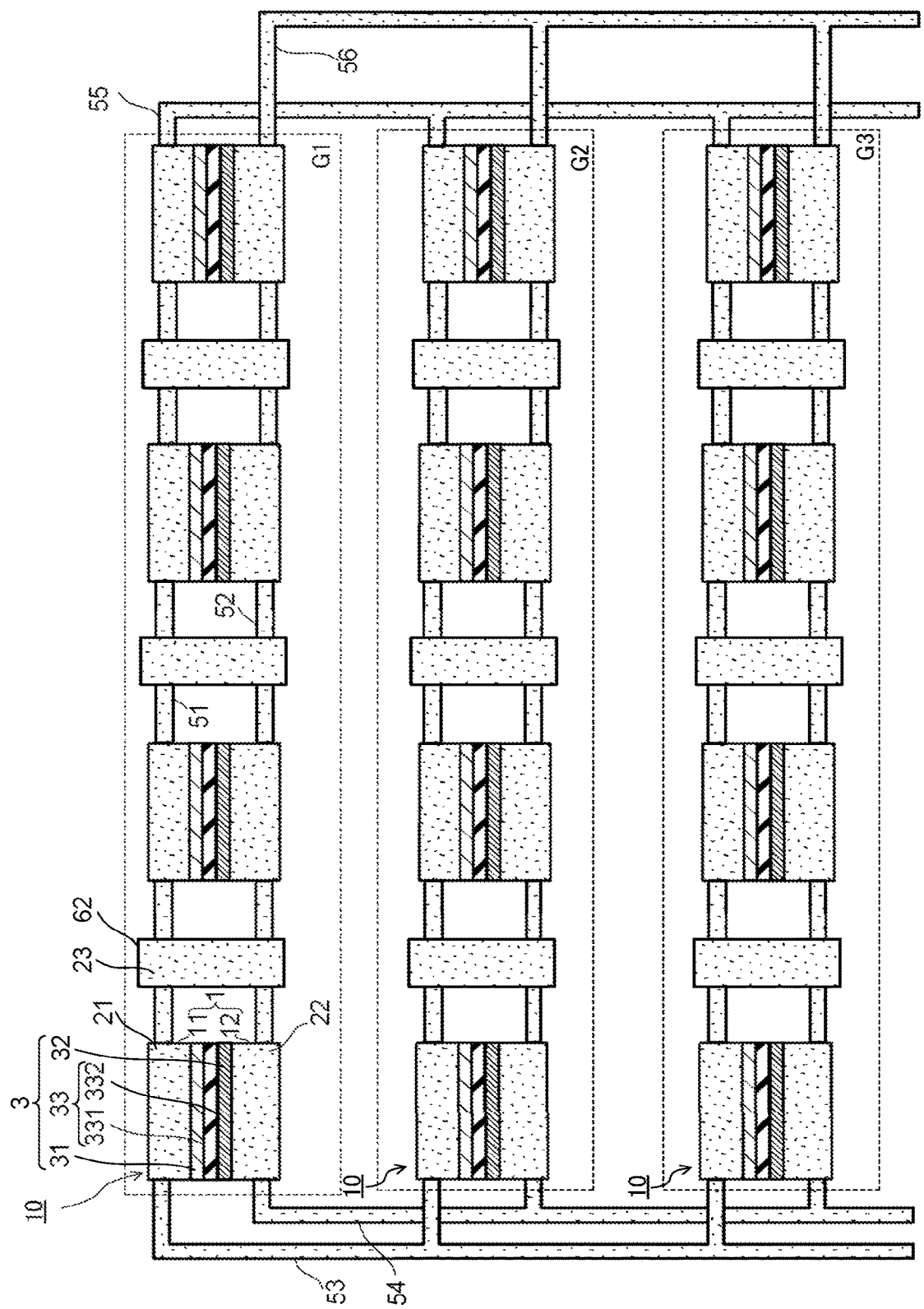
FIG. 5 is a schematic view illustrating still another structure example of the electrochemical reaction device.

An electrochemical reaction device illustrated in FIG. 5 has a different structure compared to the electrochemical reaction device illustrated in FIG. 1 at least in a point that a mixing tank 62 which has a storage part storing an electrolytic solution 23 is further included.

The mixing tank 62 connects the flow path 51 and the flow path 52. The electrolytic solution 23 contains at least one electrolytic solution component of the electrolytic solution 21 and the electrolytic solution 22. The mixing tank 62 has a three-dimensional shape with, for example, a hollow to be a storage part.

An electrode may be provided at the mixing tank 62. The electrode detects an electrolytic solution concentration, the pH, the temperature, and deterioration of the electrolytic solution. This predicts, for example, an electrolytic solution exchange timing, a catalyst layer exchange timing, and so on. The use of the electrode captures eluting materials of metal ions from the catalyst layer and eluting materials of metal ions from the photoelectric conversion layer.

The electrochemical reaction device illustrated in FIG. 5 may include a sensor which acquires data indicating at least one state from among a pH, a temperature, a flow rate, and a pressure of the electrolytic solution 23, and an adjuster which adjusts a state of the electrolytic solution in accordance with the data. For example, when the pH value of the electrolytic solution 23 is out of a range of a reference value, the electrolytic solution may be supplemented to at least one of the storage part 11 and the storage part 12 through a flow path.

Figure 6:
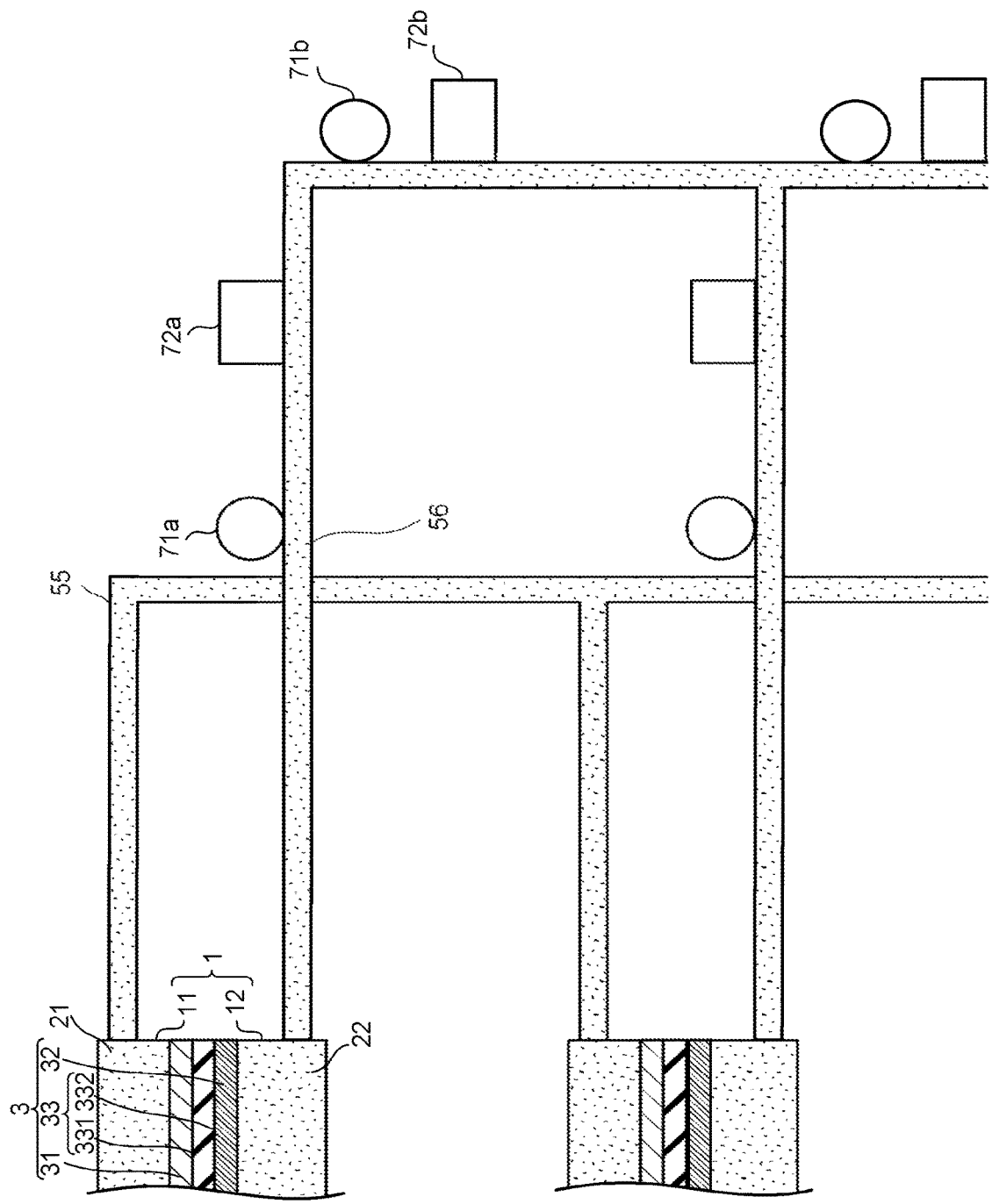
FIG. 6 is a schematic view illustrating a part of still another structure example of the electrochemical reaction device.

FIG. 6 is a schematic view illustrating a part of another example of the electrochemical reaction device. The electrochemical reaction device illustrated in FIG. 6 has a different configuration compared to the electrochemical reaction device illustrated in FIG. 1 at least in a point that there are included sensors 71a, 71b which acquire data indicating states of the electrolytic solution flowing in the flow path and adjusters 72a, 72b which adjust the states of the electrolytic solution in accordance with the data.

The sensor 71a has a function acquiring a temperature data indicating a temperature of the electrolytic solution flowing in the electrolytic tanks 1 which are serially connected through, for example, the flow path 51 or the flow path 52, namely the electrolytic solution flowing in the flow path 56. The sensor 71a is, for example, provided by the unit group.

The adjuster 72a has a function to adjust the temperature of the electrolytic solution flowing in the flow path 56 in accordance with the temperature data. Examples of the adjuster 72a include a heater. For example, a control signal which sets a preset temperature, an operation time, or the like of the heater in accordance with the temperature data is generated by a control circuit. The heater heats the electrolytic solution at the preset temperature or at the operation time in accordance with the control signal to adjust the temperature of the electrolytic solution. The adjuster 72a may include the sensor 71a.

The sensor 71a may adjust the temperature of the electrolytic solution flowing in the flow path 55. At this time, the adjuster 72a has a function to adjust the temperature of the electrolytic solution flowing in the flow path 55 in accordance with the temperature data.

The sensor 71b has a function to acquire a flow rate data indicating the flow rate of the electrolytic solution flowing in the flow path 56. The sensor 71b is provided, for example, by the unit group.

The adjuster 72b has a function to adjust the flow rate of the electrolytic solution flowing in the flow path 56 in accordance with the flow rate data. Examples of the adjuster 72b include a flow rate adjuster. For example, a control signal of the flow rate adjuster is generated in accordance with the flow rate data by the control circuit. The flow rate adjuster adjusts the flow rate of the electrolytic solution in accordance with the control signal. The adjuster 72b may include the sensor 71b.

The sensor 71b may adjust the flow rate of the electrolytic solution flowing in the flow path 55. At this time, the adjuster 72b has a function to adjust the flow rate of the electrolytic solution flowing in the flow path 55 in accordance with the flow rate data.

The electrochemical reaction device may include a pressure sensor which acquires a pressure data indicating a pressure applied on the electrolytic solution flowing in the flow path 55 or the flow path 56, and an adjuster which adjusts the pressure applied on the electrolytic solution flowing in the flow path 55 or the flow path 56 in accordance with the pressure data.

In the electrochemical reaction device illustrated in FIG. 6, the sensor and the adjuster are included by each unit group. It is thereby possible to reduce the numbers of sensors and adjusters compared to a case when the sensor and the adjuster are provided by each electrochemical reaction unit. This reduces the manufacturing cost. The sensors and the adjusters illustrated in FIG. 6 may be used for sensors and adjusters used for the other electrochemical reaction devices.

Figure 7:
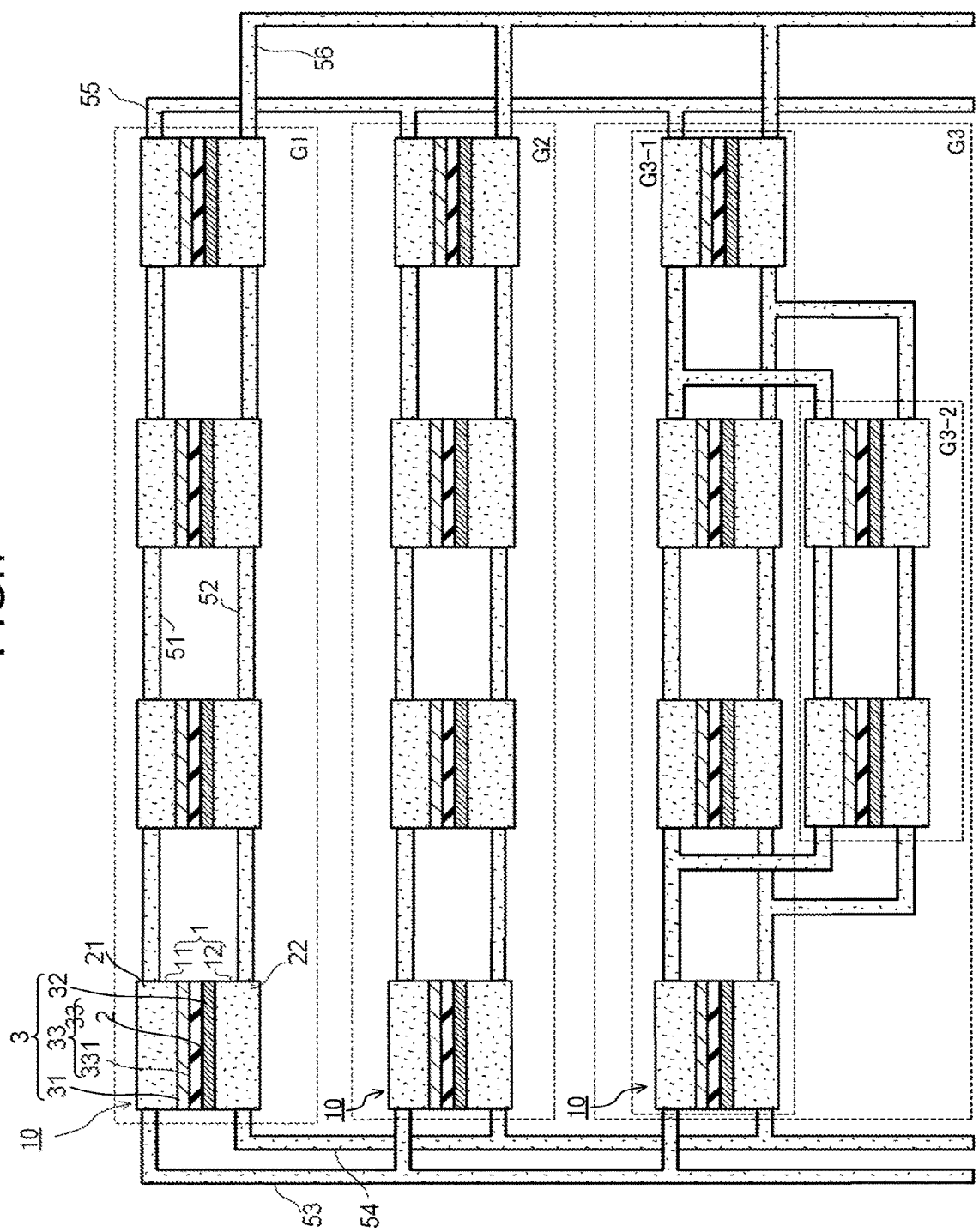
FIG. 7 is a schematic view illustrating still another structure example of the electrochemical reaction device.

FIG. 7 is a schematic view illustrating another structure example of the electrochemical reaction device. The electrochemical reaction device illustrated in FIG. 7 has a different structure compared to the electrochemical reaction device illustrated in FIG. 1 in a point that at least one unit group from among the plurality of unit groups is divided into a plurality of sub groups including a first sub group having two or more electrochemical reaction units 10 and a second sub group having one or two or more electrochemical reaction units 10. In a structure of the electrochemical reaction device illustrated in FIG. 7, the electrochemical reaction units 10 of the unit group G3 are divided into the plurality of sub groups including a sub group G3-1 having four electrochemical reaction units 10 and a sub group G3-2 having two electrochemical reaction units 10 as an example.

Respective electrolytic tanks 1 of the electrochemical reaction units 10 in the sub group G3-1 are serially connected with each other through the flow path 51 or the flow path 52. Respective electrolytic tanks 1 of the electrochemical reaction units 10 in the sub group G3-2 are serially connected with each other through the flow path 51 or the flow path 52. The electrolytic tanks 1 of the electrochemical reaction units 10 in the sub group G3-2 serially connected with each other are parallelly connected to the electrolytic tanks 1 of two or more electrochemical reaction units 10 in the sub group G3-1 through the flow path 51 or the flow path 52.

Figure 8:
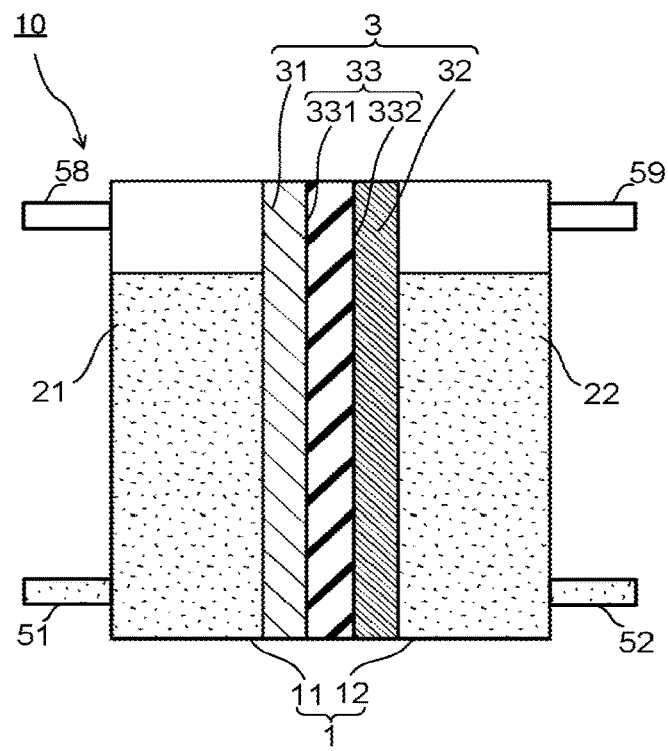
FIG. 8 is a schematic view illustrating another structure example of the electrochemical reaction unit.

FIG. 8 is a schematic view illustrating still another structure example of the electrochemical reaction unit. The electrochemical reaction unit 10 illustrated in FIG. 8 has a different structure compared to the electrochemical reaction unit 10 illustrated in FIG. 1 in a point that a flow path 58 and a flow path 59 are included. The flow path 58 has a function as a product flow path which collects products by the reduction reaction of the substances to be reduced. The flow path 59 has a function as a product flow path which collects products by the oxidation reaction of the substances to be oxidized. The products of the reduction reaction and the oxidation reaction are, for example, gas. Accordingly, the flow path 58 and the flow path 59 are preferably installed to be an upper side in a gravity direction compared to the flow path 51 and the flow path 52. The storage part 11 may have a liquid phase region containing the electrolytic solution 21 and a gas phase region containing the products of the reduction reaction, and the storage part 12 may have a liquid phase region containing the electrolytic solution 22 and a gas phase region containing the products of the oxidation reaction.

The flow path 58 connects one of the storage part 11 and the storage part 12 of one electrolytic tank 1 of the electrochemical reaction units 10 in one unit group and one of the storage part 11 and the storage part 12 of one electrolytic tank 1 of the electrochemical reaction units 10 in another unit group. The flow path 59 connects the other of the storage part 11 and the storage part 12 of one electrolytic tank 1 of the electrochemical reaction units 10 in the above-stated one unit group and the other of the storage part 11 and the storage part 12 of one electrolytic tank 1 of the electrochemical reaction units 10 in the above-stated another unit group. Namely, a group of the electrochemical reaction units which are serially connected through one flow path 58 are different from a group of the electrochemical reaction units which are connected through another flow path 58.

Figure 9:
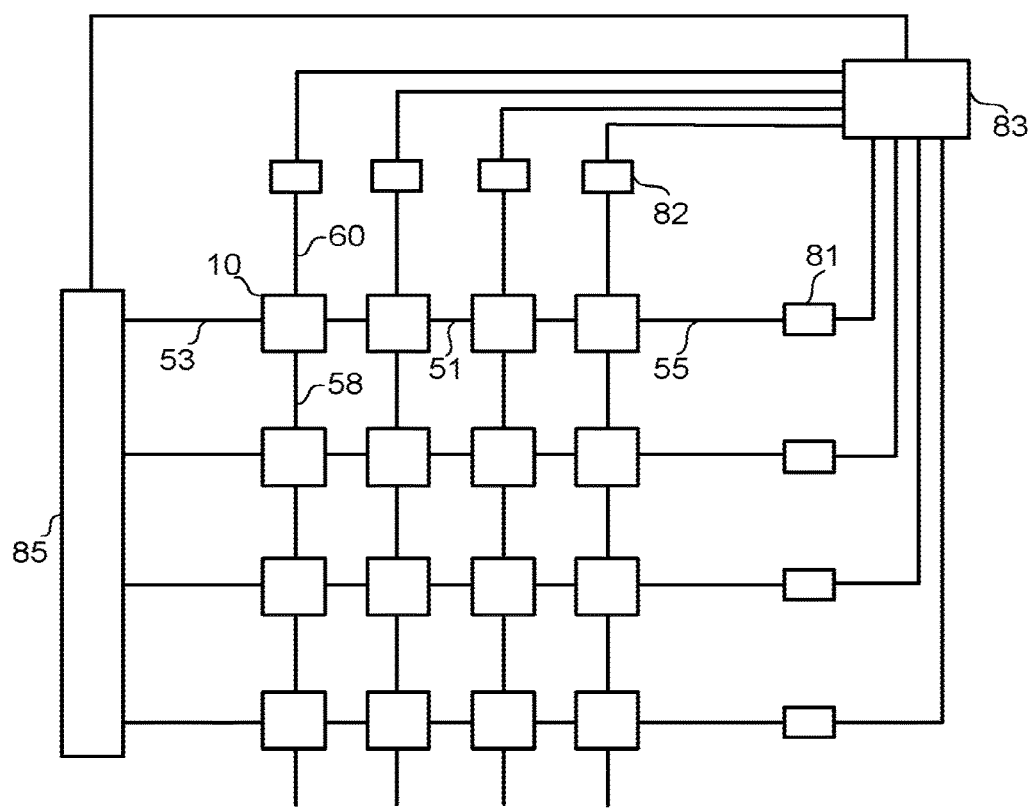
FIG. 9 is a schematic view illustrating yet another structure example of the electrochemical reaction device.

FIG. 9 is a schematic view illustrating an example of the electrochemical reaction device where the electrochemical reaction unit illustrated in FIG. 8 is applied to the electrochemical reaction device illustrated in FIG. 1. The electrochemical reaction device illustrated in FIG. 9 includes a plurality of electrochemical reaction units 10 arranged in two rows and two columns or more. Respective electrolytic tanks 1 of the electrochemical reaction units 10 at a first row are serially connected with each other through the flow path 51. Respective electrolytic tanks 1 of the electrochemical reaction units 10 at a second row are serially connected with each other through the flow path 51. The electrolytic tanks 1 serially connected with each other of the electrochemical reaction units 10 at the second row are parallelly connected to the electrolytic tanks 1 serially connected with each other of the electrochemical reaction units 10 at the first row through the flow path 51, the flow path 53, and the flow path 55. It is the same as for a case when the flow path 52, the flow path 53, the flow path 56, and the flow path 59 are provided.

The electrochemical reaction device illustrated in FIG. 9 includes sensors 81 each of which acquires data indicating at least one state from among a temperature, a flow rate, and a pressure of the electrolytic solution flowing in the electrolytic tanks 1 serially connected with each other through the flow path 51, and sensors 82 each of which acquires data indicating a production amount of products by the oxidation-reduction reaction flowing in the electrolytic tanks 1 serially connected with each other through the flow path 58. The sensor 81 acquires, for example, the data of the electrolytic solution flowing in the flow path 55. The sensor 82 acquires, for example, the data of the production amount of the products by the reduction reaction flowing in the flow path 60 which is serially connected to the electrolytic tanks 1 serially connected through the flow path 58. Examples of the sensor 81 include a sensor applicable for the sensor 71a. Examples of the sensor 82 include a gas sensor. The electrochemical reaction device illustrated in FIG. 9 may have a sensor to acquire data indicating a state of the electrolytic solution flowing in the electrolytic tanks 1 serially connected through the flow path 52 as same as the flow path 51. The electrochemical reaction device illustrated in FIG. 9 may have a sensor to acquire data indicating a production amount of products by the oxidation reaction flowing in the electrolytic tanks 1 serially connected through the flow path 59. Descriptions of the sensor 81 and the sensor 82 can be appropriately quoted in descriptions of these sensors.

The electrochemical reaction device illustrated in FIG. 9 enables to monitor the state by each electrochemical reaction unit 10. For example, the data acquired at the sensor 81 is transmitted to a control circuit 83 electrically connected to the sensor 81 to estimate an integrated value of the reaction amounts of the electrochemical reaction units 10 by each unit group. The data acquired at the sensor 82 is transmitted to the control circuit 83 which is electrically connected to the sensor 82 to estimate an integrated value of the production amounts by the oxidation-reduction reaction of the electrolytic tanks 1 serially connected through the flow path 58. An inverse matrix analysis used for a CT technology or the like is performed by the control circuit 83 by using the above-stated two integrated values to estimate the reaction amount at each electrochemical reaction unit 10. This determines the electrochemical reaction unit 10 whose reaction amount and production amount are lower than reference values as an operation failure. Further, the estimated values may be transmitted to a control circuit of an electrolytic solution supply part 85 electrically connected to the control circuit 83 to control execution of electrolytic solution supply operations. It is thereby possible to adjust the amounts of the substances to be reduced and the substances to be oxidized in the electrolytic solution.

When the electrolytic solution flow path and the product flow path are separately provided, variation in areas of liquid levels of the electrolytic solutions stored in the respective electrolytic tanks is small because a difference in pressures in the product flow paths is small. However, when the electrochemical reaction device is installed at a place with a level difference such as a slope of a mountain and an idle field of a terraced field or the like, the liquid levels of the electrolytic solutions stored in the respective electrolytic tanks have a large area difference. A contact area between the electrolytic solution and the electrode layer therefore varies by each electrolytic tank, and variation is easy to occur also in performance of the oxidation-reduction reaction. When the contact area between the electrolytic solution and the electrode is small, there are cases when reaction by a catalytic function decreases and selectivity of the reaction is lowered because a reaction density increases even if energy of the incident light is the same.

When the electrochemical reaction unit having a structure in which the photoelectric conversion layer is immersed in the electrolytic solution is installed under circumstances other than right on the equator, there is a case when it is installed while inclining a light-receiving surface relative to the gravity direction so as to abundantly receive the sunlight. At this time, the liquid level is perpendicular to the gravity direction, and therefore, an interface between gas and liquid exists between the light-receiving surface and the sun. If the light is incident from the gas phase toward the liquid phase, the light reflects at the interface between gas and liquid even if an incident angle is small, and thereby, an energy amount of the light is easy to decrease until it reaches the photoelectric conversion layer. The lowering of this reaction becomes smaller as the area of the liquid level is smaller.

The temperature of the electrolytic tank increases by being warmed by the solar energy. In particular, the photoelectric conversion layer using colored materials absorbs light, and therefore, the temperature of the electrolytic tank is easy to increase. On the other hand, the temperature of the product flow path is easy to be lower than the temperature of the electrolytic tank. Accordingly, evaporated electrolytic solution components are cooled in the product flow path to be liquefied. At this time, a gas-liquid two-phase flow is easy to occur in the product flow path, and a pressure loss becomes large due to liquid drops produced in the product flow path. Accordingly, it becomes difficult to evenly collect produced gas from each electrolytic tank. The pressures applied on the electrolytic tanks are different, and therefore, difference is easy to occur in reactions. It becomes difficult to estimate the reaction amount at each electrolytic tank by using the produced gas, intensity of sunlight, and so on resulting from these phenomena, and it becomes difficult to improve efficiency as a whole system. Further, it becomes also difficult to specify a position of a failed electrochemical reaction unit.

In the electrochemical reaction device of the embodiment, the plurality of electrochemical reaction units are divided into the plurality of unit groups, the electrochemical reaction units in the same unit group are serially connected, and the electrochemical reaction units in a different unit group are parallelly connected. This shortens the flow path while suppressing the variation in the oxidation-reduction reaction caused by the variation or the like in the pH values by electrochemical reaction units to suppress the increase in the device area and to reduce the manufacturing cost. Accordingly, the conversion efficiency from the light to the chemical substances increases.

Figure 10:
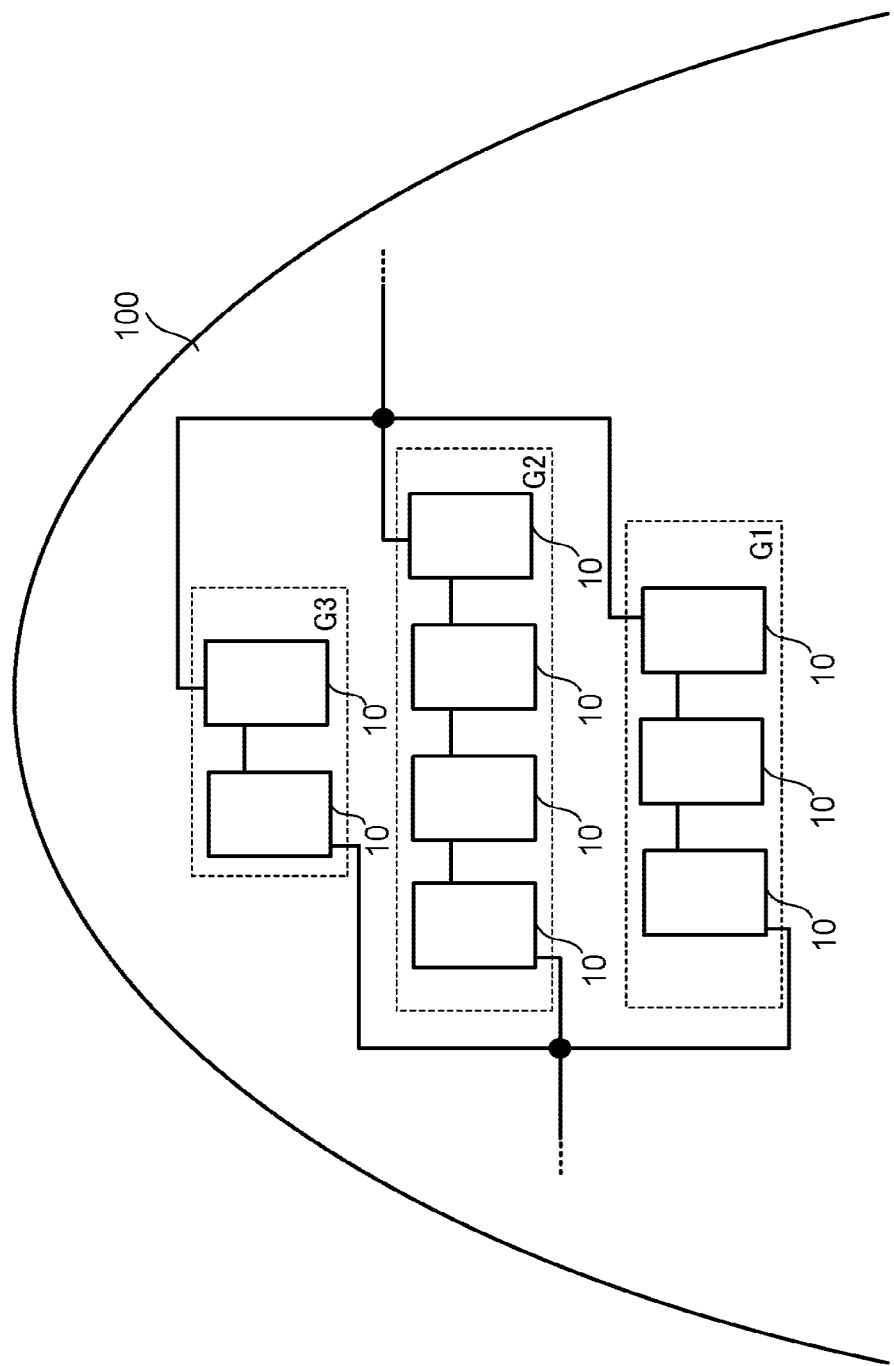
FIG. 10 is a schematic view illustrating an installation example of the electrochemical reaction device.

FIG. 10 is a schematic view illustrating an installation example of the electrochemical reaction device. Each of the electrochemical reaction units 10 in the unit group G1 to the unit group G3 is provided on a plane 100. Each of the electrochemical reaction units 10 in the unit group G3 illustrated in FIG. 10 is provided at a higher position than each of the electrochemical reaction units 10 in the unit group G2. Each of the electrochemical reaction units 10 in the unit group G2 illustrated in FIG. 10 is provided at a higher position than each of the electrochemical reaction units 10 in the unit group G1. A level difference of the respective electrochemical reaction units in the same unit group is preferably "0" (zero) cm or more and 30 cm or less. The level difference is made small, and thereby, it becomes possible to make the variations in the flow rate of the electrolytic solution and the pressure in the flow path by each electrolytic tank small, and to monitor the reaction state by each electrochemical reaction unit. A level difference of at least two of the electrochemical reaction units in the same unit group may be "0" (zero) cm or more and 30 cm or less.

When at least one catalyst layer of the reduction catalyst layer and the oxidation catalyst layer is included, performance is lowered resulting from increase in a reaction amount per a unit area if the contact area between the catalyst layer and the electrolytic solution is small. In this case, variation in the contact area between the catalyst layer and the electrolytic solution is suppressed, and it becomes possible to suppress the lowering of the performance by making the level difference small. When the plurality of electrochemical reaction units are vertically provided, and if a catalyst area is one square meter and a level difference is 30 cm, then a reaction area decreases for 30%. The level difference preferably does not exist, but it is difficult to completely eliminate the level difference because of geographical conditions of installation places, difference in shapes of the respective electrochemical reaction units 10, and so on.

The level difference may not be the level difference in the electrochemical reaction units 10 but the level difference in the catalyst layers. When it is installed at mid-latitudes, there is a case when the light is obliquely incident. At this time, each electrochemical reaction unit 10 obliquely installed enables to react effectively. When each electrochemical reaction unit 10 is obliquely installed, the decrease in the reaction area due to the level difference becomes more remarkable, and therefore, the level difference is further required to be reduced.

From the reasons as stated above, the level difference is preferably 30 cm or less, more preferably 10 cm or less if possible. The number of electrochemical reaction units 10 in each unit group is not limited to the number illustrated in FIG. 10. The level difference in the electrochemical reaction units in the same unit group is made small, and thereby, it becomes possible to suppress the variation in the performances of the oxidation-reduction reaction.

EXAMPLES

Example 1

In examples, an electrochemical reaction device including electrochemical reaction units was produced.

A structure was prepared. The structure includes a three junction type photoelectric conversion layer with a thickness of 500 nm, a ZnO layer with a thickness of 300 nm provided on a first surface of the three junction type photoelectric conversion layer, an Ag layer with a thickness of 200 nm provided on the ZnO layer, an SUS substrate with a thickness of 1.5 mm provided on the Ag layer, and an ITO layer with a thickness of 100 nm provided on a second surface of the three junction type photoelectric conversion layer.

The three junction type photoelectric conversion layer includes a first photoelectric conversion layer which absorbs light in the short wavelength region, a second photoelectric conversion layer which absorbs light in the intermediate wavelength region, and a third photoelectric conversion layer which absorbs light in the long wavelength region. The first photoelectric conversion layer includes a p-type microcrystalline silicon layer, an i-type amorphous silicon layer, and an n-type amorphous silicon layer. The second photoelectric conversion layer includes a p-type microcrystalline silicon layer, an i-type amorphous silicon germanium layer, and an n-type amorphous silicon layer. The third photoelectric conversion layer includes a p-type microcrystalline silicon germanium layer, an i-type amorphous silicon layer, and an n-type amorphous silicon layer.

An open-circuit voltage when light was irradiated on the structure was measured by using a solar simulator (AM1.5, 1000 W/m$^2$). The open-circuit voltage was 2.1 V.

An Ni(OH)$_2$ layer with a thickness of 200 nm was formed as an oxidation catalyst on the ITO layer on the structure of the three junction type photoelectric conversion layer by an electrodeposition method using nickel nitrate. A Pt layer with a thickness of 500 nm was formed as a reduction catalyst on the SUS substrate by sputtering.

The structure was cut-out into square shapes, and an edge part was sealed with a thermosetting epoxy resin. A periphery of the structure was surrounded by an ion exchange membrane (Nafion (registered trademark)) to thereby make it into a piece of sheet shape. A 10 cm square unit was produced by combining the ion exchange membrane and a plurality pieces of cells, and 10 pieces of the units were each arranged vertically and horizontally to produce a 100 cm square electrochemical reaction unit. For example, the photoelectric conversion cells were embedded into a plurality of holes of a piece of ion exchange membrane having the plurality of holes to be the sheet shape. A plurality pieces of structures each of where the photoelectric conversion cell was embedded into a hole of the ion exchange membrane having one hole may be arranged to be the sheet shape. The ion exchange membrane may be embedded into a hole of the photoelectric conversion cell having the hole.

The sheet-shaped electrochemical reaction unit was sandwiched by a pair of frames each having a hollow part with a size of 100 cm in length×100 cm in width and with a thickness of 3 cm, and a silicon resin layer was formed between the pair of frames. A window made up of a non-reflective solar battery glass was produced to cover one hollow part of the pair of frames. An acrylic resin plate was formed to cover the other hollow part of the pair of frames. A sealing body where the electrochemical reaction unit was sealed was thereby produced. A flow path was provided at each of the Ni(OH)$_2$ layer side and the Pt layer side of the electrochemical reaction unit. A 0.5 M potassium hydrogen phosphate solution where CO$_2$ gas was saturated was used as the electrolytic solution. A gas recovery flow path to collect produced gas was provided at a part of the electrolytic tank. The electrochemical reaction module was thereby produced. An acrylic container with an internal volume of 30 cm×3 cm×3 cm was connected at the Pt layer side of the module as a mixing tank.

Two modules were arranged, the flow paths and the mixing tanks of the respective modules were connected by vinyl chloride resins, an impeller type electrolytic solution pump, a pH sensor, and a temperature sensor were each provided in the mixing tanks, and a signal line was pulled out by a conducting wire sealed by the silicon resin to outside the mixing tank. Light was irradiated on the structure by using the solar simulator (AM1.5, 1000 W/m$^2$) through the window to perform the reaction. A current density of an electrode reaction was 2.5 mA/cm$^2$. A reaction time was six hours. The pH values of the electrolytic solution at the oxidation electrode side and the electrolytic solution at the reduction electrode side before the reaction were 7. On the other hand, the pH value of the electrolytic solution at the oxidation electrode side was 8, and the pH value of the electrolytic solution at the reduction electrode side was 5 after the reaction.

Comparative Example 1

A composite substrate (4 cm square) having an SUS substrate with a thickness of 1.5 mm which was connected to a power supply through a conducting wire and a platinum film with a thickness of 100 nm on the SUS substrate, and a platinum foil (4 cm square) were prepared. The power supply was a simulation device of a solar battery. A flow path and a gas flow path were formed at each of an oxidation electrode side and a reduction electrode side of acrylic frames of 5 cm square with a thickness of 1 cm. The composite substrate and the platinum foil were contained in the frame, an ion exchange membrane (Nafion 117, 6 cm square) was provided between the composite substrate and the platinum foil, and a module sandwiched by a silicon rubber sheet and an acrylic plate (7 cm in length×7 cm in width×3 mm in thickness) was each produced at both of an outside of the composite substrate and at an outside of the platinum foil. A potassium phosphate buffer solution at pH 7 was supplied into the modules. The composite substrate was set to the reduction electrode, and the platinum foil was set to the oxidation electrode. A 0.5 M potassium hydrogen carbonate solution was used as an electrolytic solution at the oxidation electrode side and an electrolytic solution at the reduction electrode side.

In the above-stated module, a current was passed at a current density of 10 mA/cm$^2$, and the reaction was performed for 1.5 hours. The pH values of the electrolytic solution at the oxidation electrode side and the electrolytic solution at the reduction electrode side before the reaction were 7. On the other hand, the pH value of the electrolytic solution at the oxidation electrode side was 11.12 after the reaction. The pH value of the electrolytic solution at the reduction electrode side was 3.85.

Example 2

A first module made up of the module of the comparative example 1 and a second module made up of the module of the comparative example 1 were arranged, a flow path at the oxidation electrode side of the first module and a flow path at the reduction electrode side of the second module were connected by a first silicon tube. A flow path at the reduction electrode side of the first module and a flow path at the oxidation electrode side of the second module were connected by a second silicon rubber tube. A tube pump was connected to each of the flow paths, and the electrolytic solution was circulated at 0.3 cc/min. The current was passed at the current density of 10 mA/cm$^2$, and the reaction was performed for 1.5 hours. In the first module, the pH value of the electrolytic solution at the oxidation electrode side was 7.00, and the pH value of the electrolytic solution at the reduction electrode side was 6.79. In the second module, the pH value of the electrolytic solution at the oxidation electrode side was 6.99, and the pH value of the electrolytic solution at the reduction electrode side was 6.55.

As is obvious from the above, a difference between the pH value of the electrolytic solution at the reduction electrode side and the pH value of the electrolytic solution at the oxidation electrode side is small in the example 1 and the example 2 compared to the comparative example 1. Changing the pH values of the electrolytic solution at the oxidation electrode side and at the reduction electrode side are suppressed by disposing the flow path connecting between the electrolytic solution at the oxidation electrode side of one of the first module and the second module and the electrolytic solution at the reduction electrode side of the other of the first module and the second module. This prevents lowering of output of the device as a whole.

Example 3

The electrolytic tanks of 20 pieces of electrochemical reaction modules were serially connected to produce an electrochemical reaction device. In each of the 20 pieces of electrochemical reaction modules, a structure where a cell size is 100 cm×100 cm, conversion efficiency of chemical substances is 10%, each of a volume of the electrolytic solution at the oxidation side and a volume of the electrolytic solution at the reduction side is 30 L is different from the electrochemical reaction module in the example 1.

Figure 11:
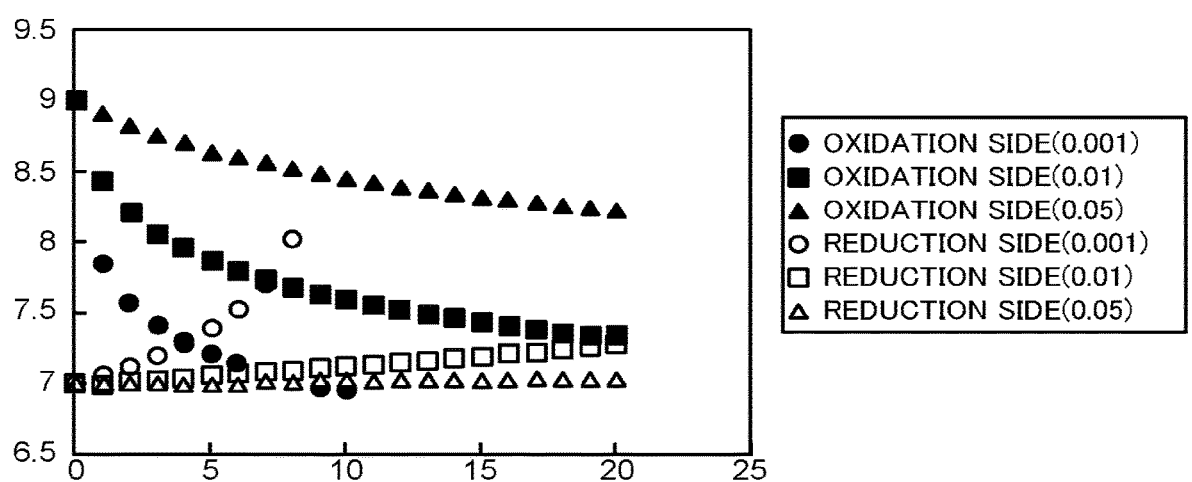
FIG. 11 is a view illustrating an evaluation result of changes in pH values of an oxidation side electrolytic solution and a reduction side electrolytic solution.

In the above-stated electrochemical reaction device, a reaction was performed for one hour in a fair weather ratio of 100%. Changes in the pH values of the oxidation side electrolytic solution and the reduction side electrolytic solution were evaluated when electrolytic solution replacement ratios of the electrochemical reaction module were 0.001%, 0.01%, and 0.05%. Evaluation results are illustrated in FIG. 11. The electrolytic solution replacement ratio can be changed by changing an amount of supplied electrolytic solution. An initial value of the pH value of the oxidation side electrolytic solution was 9. An initial value of the pH value of the reduction side electrolytic solution was 7.

When the electrolytic solution replacement ratio was 0.01%, the pH value of the oxidation side electrolytic solution was equal to the pH value of the reduction side electrolytic solution at a stage where 20 pieces of electrochemical reaction modules were serially connected. A liquid junction potential between both electrodes were thereby changed from 120 mV to "0" (zero) V, and efficiency was lowered for that extent. When the electrolytic solution replacement ratio was 0.05%, the pH value of the oxidation side electrolytic solution was equal to the pH value of the reduction side electrolytic solution at a stage where four pieces of electrochemical reaction modules were serially connected. It can be seen from the above that when the number of connected electrochemical reaction modules exceeds 20, the lowering of performance becomes remarkable. As is obvious from FIG. 11, the difference in the pH values between the oxidation side electrolytic solution and the reduction side electrolytic solution is difficult to be small even if the number of electrochemical reaction modules is increased as the electrolytic solution replacement ratio becomes higher.

It is necessary to increase the flow rate of the electrolytic solution in order to increase the electrolytic solution replacement ratio, and therefore, energy loss becomes large. It is preferable that at least the electrolytic solution of twice as much as a reaction stoichiometry is passed, namely, in each electrochemical reaction unit, amounts of the substances to be reduced and the substances to be oxidized in the electrolytic solution are set to be twice or more as much as an amount to be consumed by the oxidation-reduction reaction to improve the electrolytic solution replacement ratio.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrochemical reaction device, comprising:
    an array including first, second, third, and fourth electrochemical reaction units, each electrochemical reaction unit including:
        an electrolytic tank including a first inlet, a second inlet, a first outlet, a second outlet, a first storage part connecting the first inlet and the first outlet and connecting the second inlet and the second outlet, a third inlet, a fourth inlet, a third outlet, a fourth outlet, and a second storage part connecting the third inlet and the third outlet and connecting the fourth inlet and the fourth outlet,
        a reduction electrode disposed in the first storage part, and
        an oxidation electrode disposed in the second storage part;
    a first pipe directly connecting the first outlet or the third outlet of the electrolytic tank of the first electrochemical reaction unit and the first inlet or the third inlet of the electrolytic tank of the second electrochemical reaction unit therethrough;
    a second pipe directly connecting the first outlet or the third outlet of the electrolytic tank of the third electrochemical reaction unit and the first inlet or the third inlet of the electrolytic tank of the fourth electrochemical reaction unit therethrounh;
    a third pipe directly connecting the second outlet or the fourth outlet of the electrolytic tank of the first electrochemical reaction unit and the second inlet or the fourth inlet of the electrolytic tank of the third electrochemical reaction unit therethrough;
    a fourth pipe directly connecting the second outlet or the fourth outlet of the electrolytic tank of the second electrochemical reaction unit and the second inlet or the fourth inlet of the electrolytic tank of the fourth electrochemical reaction unit therethrough;
    a first sensor to acquire a first data indicating at least one state from among a temperature, a flow rate, and a pressure of an electrolytic solution flowing in the electrolytic tanks serially connected with each other by the first pipe;
    a second sensor to acquire a second data indicating at least one state from among a temperature, a flow rate, and a pressure of the electrolytic solution flowing in the electrolytic tanks serially connected with each other by the second pipe;
    a third sensor to acquire a third data indicating at least one product selected from the group consisting of a reduction product and an oxidation product flowing in the electrolytic tanks serially connected with each other by the third pipe;
    a fourth sensor to acquire a fourth data indicating at least one product selected from the group consisting of a reduction product and an oxidation product flowing in the electrolytic tanks serially connected with each other by the fourth pipe;
    an electrolytic solution supply to supply the electrolytic solution to the first to fourth units; and
    a controller connected to the first to fourth sensors and programmed to control the supply of the electrolytic solution from the electrolytic solution supply to the first to fourth electrochemical reaction units in accordance with the first data to the fourth data.

2. The device of claim 1, wherein at least one of the electrochemical units further comprises a photoelectric convertor having a first surface connected to the reduction electrode and a second surface connected to the oxidation electrode.

3. The device of claim 2, wherein in the at least one electrochemical unit the reduction electrode is in contact with the first surface, and
    the oxidation electrode is in contact with the second surface.

4. The device of claim 1,
    wherein each electrochemical reaction unit further includes an ion exchange membrane disposed between the first storage part and the second storage part.

* * * * *